(12) United States Patent
Singh et al.

(10) Patent No.: US 11,843,577 B2
(45) Date of Patent: *Dec. 12, 2023

(54) FINGERPRINTING TO IDENTIFY DEVICES AND APPLICATIONS FOR USE IN MANAGEMENT AND POLICY IN THE CLOUD

(71) Applicant: Zscaler, Inc., San Jose, CA (US)

(72) Inventors: Ajit Singh, Fremont, CA (US); Vivek Ashwin Raman, San Jose, CA (US); Abhinav Bansal, San Jose, CA (US); Thomas Evan Keiser, Jr., Boston, MA (US); John H. O'Neil, Watertown, MA (US)

(73) Assignee: Zscaler, Inc., San Jose, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 17/402,933

(22) Filed: Aug. 16, 2021

(65) Prior Publication Data
US 2021/0377210 A1    Dec. 2, 2021

Related U.S. Application Data

(63) Continuation-in-part of application No. 16/674,111, filed on Nov. 5, 2019, now Pat. No. 11,134,386.
(Continued)

(51) Int. Cl.
*H04L 29/12*    (2006.01)
*H04L 29/06*    (2006.01)
(Continued)

(52) U.S. Cl.
CPC .......... *H04L 61/4511* (2022.05); *G06F 21/57* (2013.01); *H04L 63/0272* (2013.01); *H04L 63/0281* (2013.01); *H04L 63/0884* (2013.01); *H04L 63/20* (2013.01); *H04L 67/02* (2013.01); *H04L 67/10* (2013.01); *H04L 67/1001* (2022.05); *H04L 67/125* (2013.01); *H04L 67/51* (2022.05); *H04L 67/535* (2022.05);
(Continued)

(58) Field of Classification Search
CPC ..... H04L 61/4511; H04L 67/51; H04L 67/56; H04L 67/562; H04L 67/1001; H04L 67/535; H04L 63/0272; H04L 63/0281; H04L 63/0884; H04L 63/20; H04L 67/02; H04L 67/10; H04L 67/125; H04L 69/162; H04W 12/088; H04W 12/086; H04W 12/122; G06F 21/57
See application file for complete search history.

(56) References Cited

U.S. PATENT DOCUMENTS 8,464,335 B1    6/2013    Sinha et al.
8,495,737 B2    7/2013    Sinha et al.
(Continued)

*Primary Examiner* — Yonas A Bayou
(74) *Attorney, Agent, or Firm* — Baratta Law PLLC; Lawrence A. Baratta, Jr.

(57) ABSTRACT

Systems and methods include obtaining a plurality of parameters associated with a host; determining a fingerprint of the host utilizing the plurality of parameters; and providing the fingerprint to cloud service for enrollment and management of the host in the cloud service. The cloud service can include microsegmentation of the host. The cloud service can include any of Internet access for the host and private resource access by the host.

20 Claims, 24 Drawing Sheets

Related U.S. Application Data which is a continuation-in-part of application No. 16/252,961, filed on Jan. 21, 2019, now Pat. No. 10,511,607, which is a continuation of application No. 15/377,126, filed on Dec. 13, 2016, now Pat. No. 10,225,740.

(51) Int. Cl.

| | | |
|---|---|---|
| *G06F 21/57* | (2013.01) | |
| *H04L 29/08* | (2006.01) | |
| *H04W 12/086* | (2021.01) | |
| *H04W 12/088* | (2021.01) | |
| *H04W 12/122* | (2021.01) | |
| *H04L 61/4511* | (2022.01) | |
| *H04L 9/40* | (2022.01) | |
| *H04L 69/16* | (2022.01) | |
| *H04L 67/125* | (2022.01) | |
| *H04L 67/02* | (2022.01) | |
| *H04L 67/10* | (2022.01) | |
| *H04L 67/51* | (2022.01) | |
| *H04L 67/56* | (2022.01) | |
| *H04L 67/50* | (2022.01) | |
| *H04L 67/562* | (2022.01) | |
| *H04L 67/1001* | (2022.01) | |
| *H04L 101/663* | (2022.01) | |

(52) U.S. Cl.
CPC ............ *H04L 67/56* (2022.05); *H04L 67/562* (2022.05); *H04L 69/162* (2013.01); *H04W 12/086* (2021.01); *H04W 12/088* (2021.01); *H04W 12/122* (2021.01); *H04L 63/164* (2013.01); *H04L 2101/663* (2022.05)

(56) References Cited

U.S. PATENT DOCUMENTS

| | | | |
|---|---|---|---|
| 8,955,091 | B2 | 2/2015 | Kailash et al. |
| 9,058,495 | B2* | 6/2015 | Brannon ................. G06F 21/10 |
| 9,060,239 | B1 | 6/2015 | Sinha et al. |
| 9,118,689 | B1 | 8/2015 | Desai et al. |
| 9,350,644 | B2 | 5/2016 | Desai et al. |
| 9,369,433 | B1 | 6/2016 | Paul et al. |
| 9,378,350 | B2* | 6/2016 | Stuntebeck ........... H04W 12/08 |
| 9,413,754 | B2* | 8/2016 | Stuntebeck ............. G06F 21/36 |
| 9,473,537 | B2 | 10/2016 | Sinha et al. |
| 9,516,005 | B2* | 12/2016 | DiRico ................. H04L 63/107 |
| 9,516,066 | B2* | 12/2016 | Brannon ............... H04W 12/10 |
| 9,584,964 | B2* | 2/2017 | Pelkey ............... H04W 12/065 |
| 9,665,576 | B2* | 5/2017 | Kapoor ................. H04W 12/08 |
| 9,665,577 | B2* | 5/2017 | Kapoor ................. H04W 12/37 |
| 9,813,247 | B2* | 11/2017 | Stuntebeck ............. G06F 21/30 |
| 9,819,682 | B2* | 11/2017 | Dabbiere ................ H04L 63/10 |
| 9,825,996 | B2* | 11/2017 | Brannon ............... H04W 12/10 |
| 9,916,446 | B2* | 3/2018 | Phanse .................... H04L 63/20 |
| 2011/0167474 | A1* | 7/2011 | Sinha ..................... G06F 21/51 726/1 |
| 2015/0326613 | A1 | 11/2015 | Devarajan et al. |
| 2016/0261564 | A1 | 9/2016 | Foxhoven et al. |

* cited by examiner

FINGERPRINTING TO IDENTIFY DEVICES AND APPLICATIONS FOR USE IN MANAGEMENT AND POLICY IN THE CLOUD

CROSS-REFERENCE TO RELATED APPLICATION(S)

The present patent/application is a continuation-in-part of U.S. patent application Ser. No. 16/674,111, filed Nov. 5, 2019, and entitled "Device identification for management and policy in the cloud," which was a continuation-in-part of U.S. patent application Ser. No. 16/252,961 filed Jan. 21, 2019 (now U.S. Pat. No. 10,511,607, issued Dec. 17, 2019), and entitled "Multidimensional risk profiling for network access control of mobile devices through a cloud-based security system," which was a continuation of U.S. patent application Ser. No. 15/377,126 filed Dec. 13, 2016 (now U.S. Pat. No. 10,225,740, issued Mar. 5, 2019), and entitled "Multidimensional risk profiling for network access control of mobile devices through a cloud-based security system," the contents of each are incorporated herein by reference.

FIELD OF THE DISCLOSURE

The present disclosure generally relates to computer networking systems and methods. More particularly, the present disclosure relates to systems and methods for fingerprinting to identify devices and applications for use in management and policy in the cloud.

BACKGROUND OF THE DISCLOSURE

There is a staggering growth of endpoint mobile devices in enterprises. With this influx, Information Technology (IT) administrators can no longer ignore these mobile devices as simply outside their scope of responsibility. Correspondingly, there has been an unprecedented growth in the cloud services that are made available by an enterprise to its employees. Traditionally, enterprises have deployed one secure application for each service for each platform, but this has eventually failed to scale with the growth of mobility in IT. There are myriad numbers of cloud-based services that are being accessed from unmanaged endpoint mobile devices across diverse operating systems, uncontrolled network topologies and vaguely understood mobile geographies. Typically, enterprises have deployed applications for a specific service, applications to access corporate resources that themselves vary for different network conditions, and applications to secure the endpoints itself.

Conventionally, for each application, the enterprise user must perform numerous steps. For example, the end user must contact an enterprise administrator (i.e., in person or web portal) to configure the mobile device to use the end-point application for a corresponding service. The end user must enroll in each application to access a service, and the enterprise administrator has to undertake to the complex tasks of tracking, deploying and managing individual apps on each endpoint mobile device. Accordingly, it would be advantageous to eliminate the multiple applications for various enterprise functions, to enable a user to connect to multiple cloud services.

Normally, to securely access multiple network resources concurrently, the end user has to connect to multiple applications, such as a corporate VPN for accessing enterprise's internal resources (intranet) and a private VPN or a network filtering application for accessing internet resources. This is not only perplexing for the end user but also creates several compatibility issues between different applications which compete for network access at different layers of networking. For instance, the service of a Virtual Private Network (VPN) application to securely connect to an enterprise network is affected by a web security firewall application running on the device which monitors and forbids any network interface changes. The situation is further exacerbated by the fact that the user needs to reconfigure each application depending upon the changes in network conditions such as moving from one subnet to another and that there is no indication to the user to perform such a change. All such service transitions must then be performed manually by the user with every network change. This is analogous to the situation where a user must statically configure Internet Protocol (IP) address configuration on a network interface for every network change. This problem was overcome by Dynamic Host Configuration Protocol (DHCP) that discovers configuration for the interface such as IP Address, Subnet Mask, Default Gateways and Domain Name System (DNS) servers. With the advent of mobility and explosion in the number of cloud services and mobile applications, there is a similar need for unified service discovery and secure availability.

Additionally, IT administrators need to restrict mobile devices with high risk from network access or sensitive corporate resources to prevent any data breaches or network attack vulnerabilities. With visibility into the actual risk of a mobile device, one approach is to restrict access to these sensitive resources from a mobile device. However, it is advantageous and useful to allow network access to mobile devices to improve productivity.

Conventional Network Access Control (NAC) systems are predominantly static and severely limited in scope and implementation. Most NACs are on premise and rely on pre-enrollment static verifications on the requesting mobile device such as anti-virus status, system update level, and configurations. If the mobile device conforms to the business policy and inventory management systems, the access to the network is granted or denied. This mode of operation blatantly fails for mobile devices which allow users to access network resources from a variety of mobile applications and network carriers across different geographies where a traditional IT admin has no control. For example, a mobile device may bring malware from any outside network into enterprise network and contaminate all other network devices.

Further, the systems that NACs employ to profile risk often operate in autonomous isolation and have only limited user/device context that notably masks the appraisal of risk. For instance, a malicious user having a record of accessing malware applications with a "known" on-premise device may be allowed access to sensitive corporate resources without any advanced security challenge whereas another benign user with an "unknown" mobile device may be disallowed access to a trivial resource or be challenged with some strongest multi-factor authentication. Also, the IT administrator has to bear the responsibility of diligently updating NAC servers as new threats emerge to accurately measure the threat profile of the requesting device.

Further, there is a requirement for some unique device identifier for a service provider to detect changes in device state, enforce policy on the device, manage the device (and the associated user), and the like. The problem is existing device identifiers can be easily spoofed. For example, with mobile devices, devices continually change networks and locations—it is not feasible to identify devices based on source Internet Protocol (IP) protocol or other source protocol parameters. Other identifiers can include a Unique Device Identifier (UDID) that can be generated and stored on a user device. However, such UDIDs can be removed and replaced. Another identifier can include a manufacturer serial number. However, many vendors do not set serial numbers, and these can be changed.

BRIEF SUMMARY OF THE DISCLOSURE

In various embodiments, the present disclosure relates to systems and methods for fingerprinting to identify devices and applications for use in management and policy in the cloud. The present disclosure can include a method having steps, a host configured to implement the steps, and a non-transitory computer-readable medium having instructions for the steps. The steps include obtaining a plurality of parameters associated with a host; determining a fingerprint of the host utilizing the plurality of parameters; and providing the fingerprint to cloud service for enrollment and management of the host in the cloud service. The host can be a user device having an agent operating thereon to perform the determining. The host can be any of a server, virtual machine, and a container. The cloud service can include microsegmentation of the host. The cloud service can be configured to match a unique identifier of the host with the fingerprint for the enrollment and management. The plurality of hardware parameters can be obtained through any of assembly code and operating system Application Programming Interfaces (APIs). The plurality of parameters can relate to any of a processor identifier, a manufacturer serial number, a hard drive serial number, hard drive parameters, and battery. The steps can further include, subsequent to the enrollment of the host in the cloud service, redetermining the fingerprint locally on the host for operation of the cloud service, such that the fingerprint is recomputed and not stored on the host. The fingerprint can be determined based on a computation of the plurality of parameters that is unique for every device. The cloud service can include any of Internet access for the host and private resource access by the host.

Also, in another embodiment, the present disclosure relates to systems and methods for device identification for management and policy in the cloud. The present disclosure uses a combination of several hardware parameters and user's identification to generate a unique identifier for a user device and associated user. IOCTL and Assembly can be used to get the different hardware parameters. All the hardware parameters can then run through a process to generate a fixed size hardware fingerprint. A base64 encoding can be performed to convert it into a string, for consumption of database. The resultant identifier is unique and it is never stored on machine. The application can simply generate it whenever needed. The resultant identifier can used by a service provider to uniquely identify the device even when the device is moving hands or locations. The resultant identifier is never stored, so moving data from one device to another will not result in the same identifier for two devices. Further, the process is resilient to spoofing, namely the identifier is tightly coupled to multiple hardware parameters. A refresh or formatting of a same device will still result in a same identifier. With these processes, a service provider can track and manage devices, as well as enforce policy on a user device basis. Also, rogue devices and users can be tracked and identified.

In an embodiment, a method and a non-transitory computer-readable storage medium includes computer readable code stored thereon for programming a processor to perform steps of obtaining a plurality of hardware parameters associated with a user device; utilizing the plurality of hardware parameters to determine a hardware fingerprint of the user device; and utilizing the hardware fingerprint for a plurality of enrollment and management of the user device in a cloud service. Additional steps can include obtaining a unique identifier of a user from the user device; and utilizing the hardware fingerprint and the unique identifier of the user for the plurality of enrollment and management of the device in a cloud service. The unique identifier of the user can be based on a user account in an operating system of the user device. The plurality of hardware parameters can be obtained through any of assembly code, operating system Application Programming Interfaces (APIs), and IOCTL. The plurality of hardware parameters can relate to any of a processor identifier, a manufacturer serial number, a hard drive serial number, hard drive parameters, and battery. Additional steps can include, subsequent to the enrollment of the user device in the cloud service, redetermining the hardware fingerprint locally on the user device for operation of the cloud service, such that the hardware fingerprint is recomputed and not stored on the user device. The hardware fingerprint can be determined based on a bit computation of the plurality of hardware parameters that is unique for every device.

In an embodiment, a method implemented in a cloud node in a cloud-based security system for network access control of a mobile device based on multidimensional risk profiling thereof includes receiving posture data from the mobile device; determining a device fingerprint and a risk index of the mobile device based on the posture data; and, responsive to a request by the mobile device for network resources through the cloud-based security system, performing a multidimensional risk analysis based on the device fingerprint and the risk index and allowing or denying the request based on the multidimensional risk analysis. The posture data can be obtained from a client application executed on the mobile device, and wherein the client application communicatively couples the mobile device to the cloud-based security system for network access therethrough. The posture data can be obtained from a client application executed on the mobile device, and wherein the client application can be configured to periodically capture the posture data comprising hardware parameters, applications installed, versions of the applications, and operating system parameters and patches. The posture data can include a hash of the information and the receiving is periodically performed for updates thereto.

The multidimensional risk analysis can include a weighted combination of device risk, application risk, resource risk, user risk, and environment risk. The device risk can include risk involved in accessing the network resource from the mobile device based on the posture data; the application risk can include risk involved in using a specific application to access the network resource based on the posture data; the resource risk can include potential of the network resource to cause damage; the user risk can include risk based on a user's network behavior on the mobile device based on the posture data and based on monitoring by the cloud-based security system; and the environment risk can include risk assessed by the cloud-based security system based on geolocation and global threat conditions. The weighted combination can be based on enterprise policy. The risk index for the mobile device can be updated over time based on network access history and updates to the posture data. Present access can be weighted higher than past access in a weighted combination of risk in the multidimensional risk analysis. The multidimensional risk analysis can determine a risk score associated with the request for network resources, and wherein the allowing or denying the request is based on the risk score.

In another embodiment, a cloud node in a cloud-based security system, configured to provide network access control of a mobile device based on multidimensional risk profiling includes a network interface, a data store, and a processor communicatively coupled to one another; and memory storing computer executable instructions, and in response to execution by the processor, the computer-executable instructions cause the processor to receive posture data from the mobile device; determine a device fingerprint and a risk index of the mobile device based on the posture data; and, responsive to a request by the mobile device for network resources through the cloud-based security system, perform a multidimensional risk analysis based on the device fingerprint and the risk index and allow or deny the request based on the multidimensional risk analysis.

In a further embodiment, a mobile device communicatively coupled to a cloud-based security system which provides network access control based on multidimensional risk profiling includes a network interface, a data store, and a processor communicatively coupled to one another; and memory storing computer executable instructions, and in response to execution by the processor, the computer-executable instructions cause the processor to obtain posture data associated with the mobile device through a client application; provide the posture data to the cloud-based security system for determination of a device fingerprint and a risk index of the mobile device based thereon; and request network resources through the cloud-based security system via the client application, wherein the request is allowed or denied by the cloud-based security system based on a multidimensional risk analysis based on the device fingerprint and the risk index.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
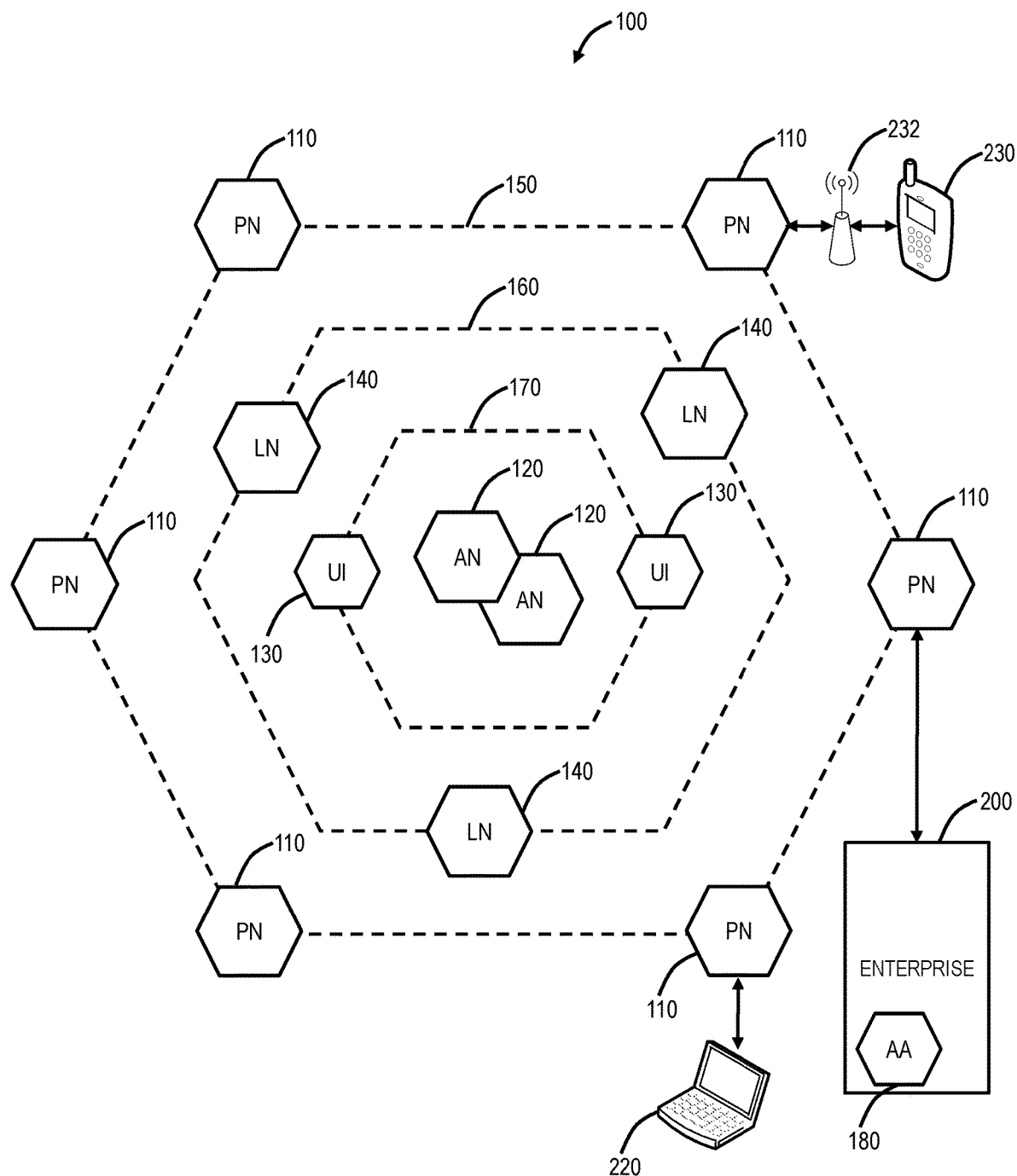
FIG. 1 is a network diagram of a distributed security system.

Again, In various embodiments, the present disclosure relates to systems and methods for fingerprinting to identify devices and applications for use in management and policy in the cloud.

Also, in various embodiments, the present disclosure relates to systems and methods for device identification for management and policy in the cloud. The present disclosure uses a combination of several hardware parameters and user's identification to generate a unique identifier for a user device and associated user. IOCTL and Assembly can be used to get the different hardware parameters. All the hardware parameters can then run through a process to generate a fixed size hardware fingerprint. A base64 encoding can be performed to convert it into a string, for consumption of database. The resultant identifier is unique and it is never stored on machine. The application can simply generate it whenever needed. The resultant identifier can used by a service provider to uniquely identify the device even when the device is moving hands or locations. The resultant identifier is never stored, so moving data from one device to another will not result in the same identifier for two devices. Further, the process is resilient to spoofing, namely the identifier is tightly coupled to multiple hardware parameters. A refresh or formatting of a same device will still result in a same identifier. With these processes, a service provider can track and manage devices, as well as enforce policy on a user device basis. Also, rogue devices and users can be tracked and identified.

Also, in various embodiments, the present disclosure relates to systems and methods for multidimensional adaptive risk profiling of mobile devices for policy and access control through cloud-based security systems. The systems and methods solve the problems associated with static measures to evaluate risk and proposes a context-aware adaptive risk profiling mechanism for mobile devices from several dimensions using a cloud-based network security system that records the mobile device's network usage patterns to take intelligent access control decisions. Variously, the systems and methods utilize a cloud-based security system coupled with a mobile application ("app") operating on associated mobile devices. The app is utilized in conjunction with the cloud-based security system to employ multidimensional risk profiling of mobile clients. With this risk profiling, the cloud-based security system can provide intelligent access control and policy decisions minimizing the security risk and maximizing the user productivity. Advantageously, a cloud-based approach to assess risk eliminates the need to update Network Access Control (NAC) servers with emerging threat information. Based on user risk, access to sensitive resources (such as banking websites or the like) or internal corporate resources can be denied or supported through multi-factor risk-based authentication models. Granular network quarantine restrictions can be achieved based on the risk level of the user (mobile device) and the enterprise policy. With a cloud-based approach to network access control, risk can be correlated universally from multiple perspectives that further accounts for better security. For instance, if an otherwise benign user (mobile device) is trying to access an application which was recently accessed by a family of malware, the access can be immediately quarantined.

Also, in various embodiments, the present disclosure relates to systems and methods for cloud-based unified service discovery and secure availability. The systems and methods enable a user to connect to multiple cloud services through the dynamic discovery of available services followed by authentication and access as exposed in the corresponding service protocol. The systems and methods address the unmanageable growth of mobility and cloud-based services which have led to a proliferation of individual applications for access to individual services. The systems and method can be implemented through a mobile application ("app") which overcomes the hassle of deploying and managing several applications across a gamut of mobile devices, operating systems, and mobile networks to gain secure access to the cloud-based internet or intranet resources. The mobile application can uniquely perform a Dynamic evaluation of Network and Service Discovery, Unified Enrollment to all services, Application dependent service enablement, Service protocol learning, Service Availability through secure network traffic forwarding tunnels, and the like.

Again, enterprises have a strong need to provide secure access to cloud services to its end users. The growth of mobility and cloud in the IT enterprise has made it impossible for IT admins to deploy individual applications for individual services. The mobile app associated with the systems and methods overcomes these limitations through the dynamic discovery of available services to the end user, followed by authentication and access to individual services. Further, the mobile app insightfully learns the protocol for each service and establishes a secure tunnel to the service. In essence, the mobile app is one app that an enterprise may use to provide secure connectivity to the Internet and diversified internal corporate applications. At the time of user enrollment, the mobile app will discover all services provided by the enterprise cloud and will enroll the user to all of those services. It will then set up secure tunnels for each application depending upon whether the application is internet bound or if it is internal to the corporate network (intranet).

The mobile app will also discover all applications provided within the enterprise cloud along with a Global Virtual Private Network (GVPN) service and show the available services to end user. Endpoint Applications today provide one service for a specific network function (such as Virtual Private Network (VPN) to a corporate network, web security, antivirus to access the Internet). The mobile app can be used to enable all these services with single enrollment. The mobile app will provide services to darknet applications along with securing the Internet traffic. The mobile app can set up a local network on the mobile device.

§ 1.0 EXAMPLE HIGH-LEVEL SYSTEM ARCHITECTURE—CLOUD-BASED SECURITY SYSTEM

FIG. 1 is a block diagram of a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, Data Leakage Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100. In an embodiment, each of the processing nodes 110 may include a decision system, e.g., data inspection engines that operate on a content item, e.g., a web page, a file, an email message, or some other data or data communication that is sent from or requested by one of the external systems. In an embodiment, all data destined for or received from the Internet is processed through one of the processing nodes 110. In another embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an embodiment, the actions taken by one of the processing nodes 110 may be determinative on the threat classification of the content item and on a security policy of the external system to which the content item is being sent from or from which the content item is being requested by. A content item is violating if, for any part C=[c1, c2, ..., cm] of the content item, at any of the processing nodes 110, any one of the data inspection engines generates an output that results in a classification of "violating."

Figure 3:
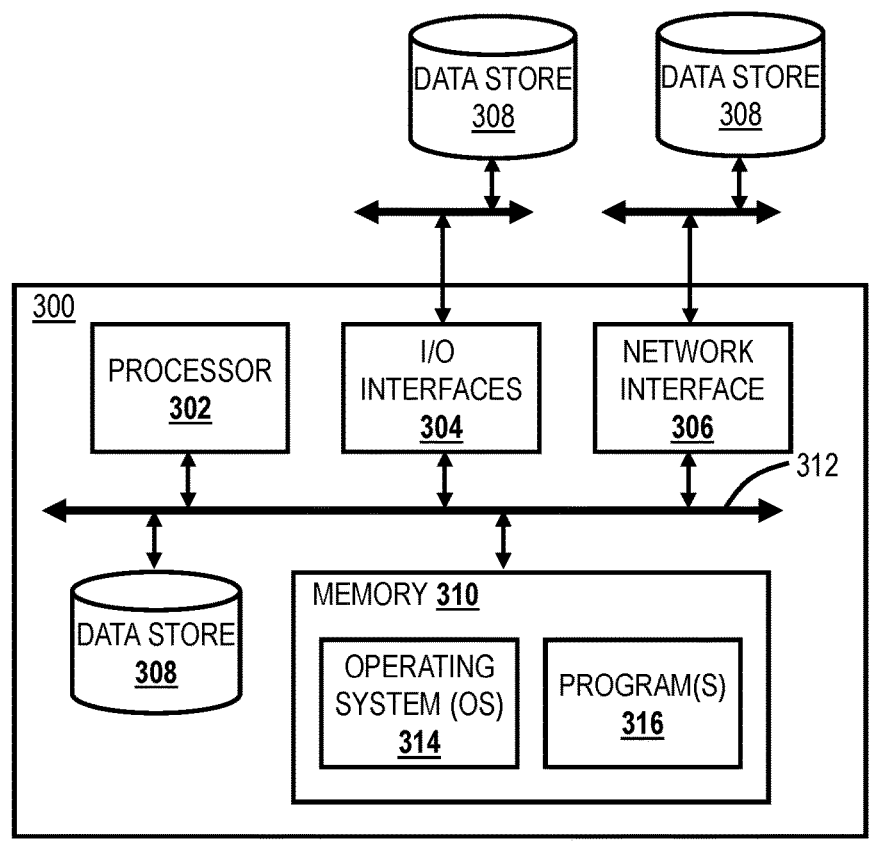
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an embodiment, the processing nodes 110 may serve as an access layer 150. The access layer 150 may, for example, provide external system access to the security system 100. In an embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an embodiment, each of the authority nodes 120 may be implemented by one or more computer and communication devices, e.g., server computers, gateways, switches, etc., such as the server 300 described in FIG. 3. In some embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain websites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an embodiment, the processing node 110 may act as a forward proxy that receives user requests to external servers addressed directly to the processing node 110. In another embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise, the access agent 180 may be configured to perform MPLS labeling. In another transparent proxy mode embodiment, a protected system, such as the enterprise 200, may identify the processing node 110 as a next hop router for communication with the external servers.

Generally, the distributed security system 100 may generally refer to an example cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one embodiment of a cloud-based system, and those of ordinary skill in the art will recognize the tracking and auditing systems and methods contemplate operation on any cloud-based system.

§ 2.0 EXAMPLE DETAILED SYSTEM ARCHITECTURE AND OPERATION

Figure 2:
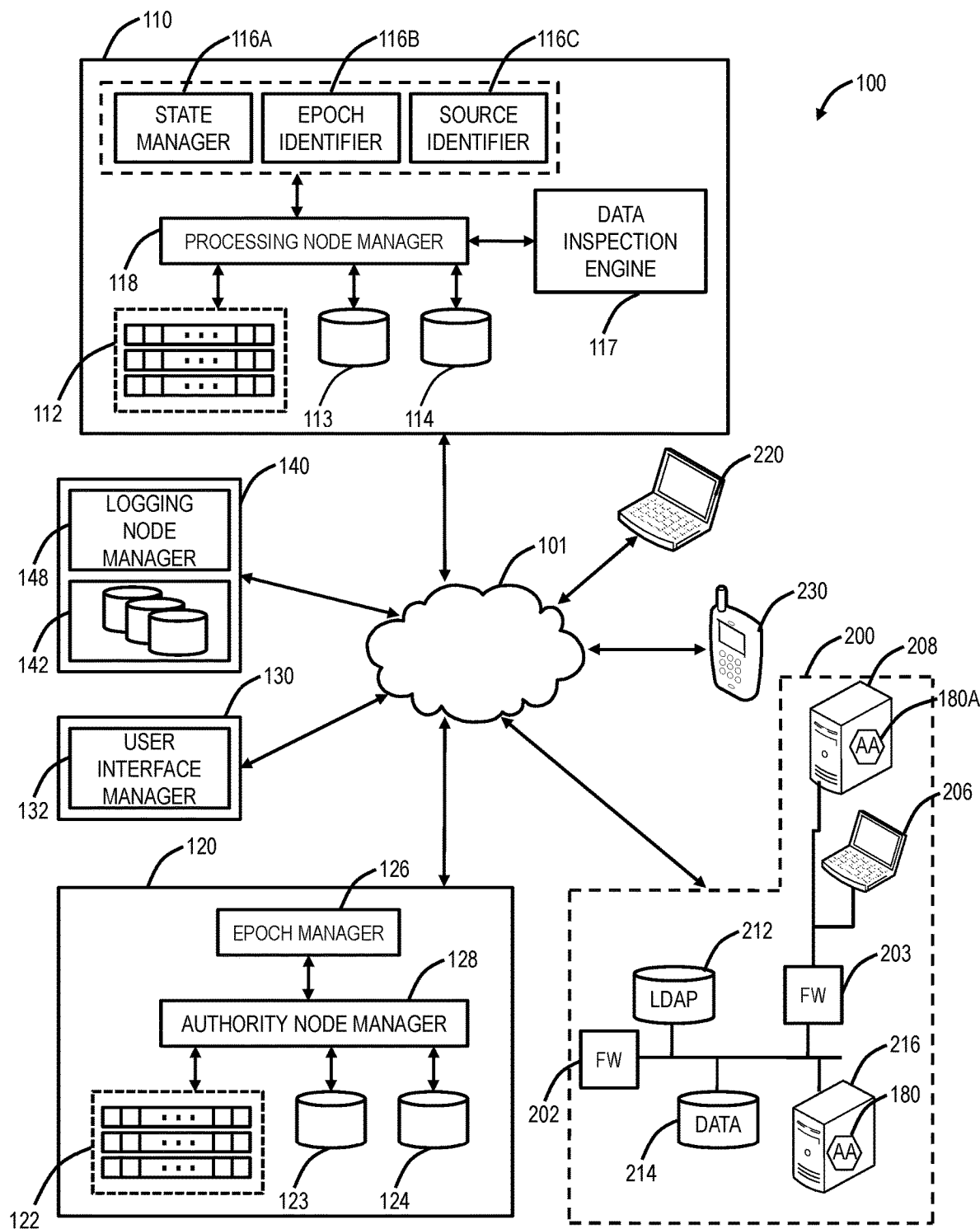
FIG. 2 is a network diagram of the distributed security system of FIG. 1 illustrating various components in more detail.

FIG. 2 is a block diagram of various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include user identifiers, login passwords, and a login history associated with each user identifier. The other data stores 214 may include sensitive information, such as bank records, medical records, trade secret information, or any other information warranting protection by one or more security measures.

In an embodiment, a client access agent 180a may be included on a client computer 206. The client access agent 180a may, for example, facilitate security processing by providing a hash index of files on the user computer 206 to a processing node 110 for malware, virus detection, etc. Other security operations may also be facilitated by the access agent 180a. In another embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the computers 206 of the enterprise 200, or to some other secure data provider server. The computer device 220 and the mobile device 230 can also store information warranting security measures, such as personal bank records, medical information, and login information, e.g., login information to a server 216 of the enterprise 200, or to some other secure data provider server.

§ 2.1 Example Processing Node Architecture

In an embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, the absence of information, while a one in that bit position can indicate the presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112. However, the worst case additional cost is only on the order of one, and thus its use for most failure queries saves on the order of m log m, where m is the number of information records present in the threat data 114.

The detection processing filter 112 thus improves the performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from processing nodes 110 when the processing node 110 has processed a content item and update the master detection processing filter 122. For example, the master detection processing filter 122 may be distributed to the processing nodes 110, which then store a local copy of the detection processing filter 112.

In an embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to an authority node 120.

The authority node manager 128, in response to receiving the threat data update, updates the master threat data 124 stored in the authority node data store according to the threat data update received from the processing node 110. In an embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to one of the authority nodes 120.

The authority node manager 128, in turn, may update the master threat data 124 and the master detection process filter 122 stored in the authority node data store according to the threat data update received from the processing node 110. In an embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are example processes for which the threat data and/or detection process filters may be updated in the system 100 of FIGS. 1 and 2. Other update processes, however, are contemplated herein. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§ 3.0 EXAMPLE SERVER ARCHITECTURE

FIG. 3 is a block diagram of a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touchpad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 EXAMPLE USER DEVICE ARCHITECTURE

Figure 4:
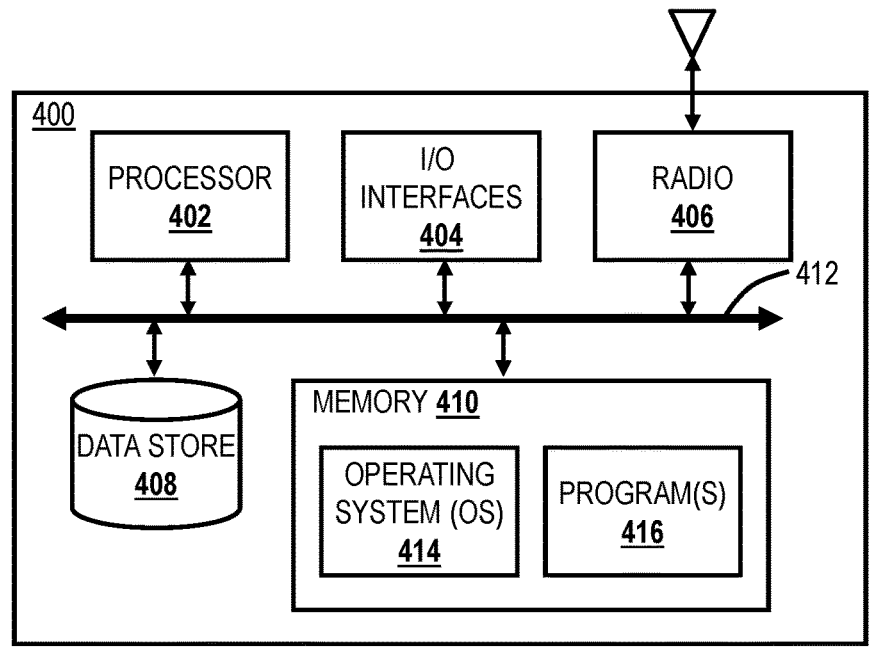
FIG. 4 is a block diagram of a mobile device which may be used in the system of FIG. 1 or with any other cloud-based system.

FIG. 4 is a block diagram of a user device 400, which may be used in the system 100 or the like. The user device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the user device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the user device 400, a semiconductor-based microprocessor (in the form of a microchip or chip set), or generally any device for executing software instructions. When the user device 400 is in operation, the processor 402 is configured to execute software stored within the memory 410, to communicate data to and from the memory 410, and to generally control operations of the user device 400 pursuant to the software instructions. In an embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the user device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the user device 400. For example, example programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 EXAMPLE GENERAL CLOUD SYSTEM

Figure 5:
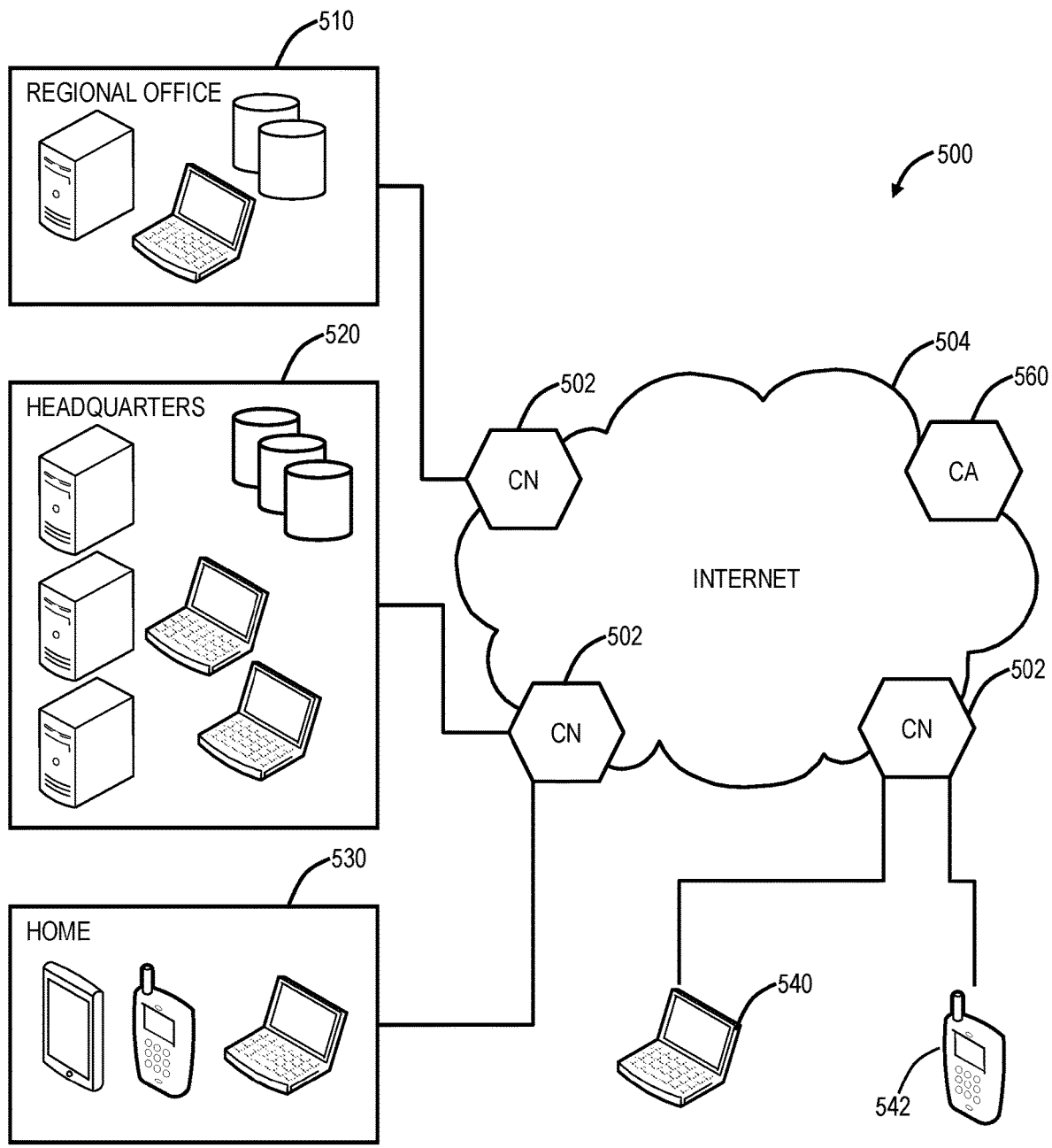
FIG. 5 is a network diagram of a generalized cloud-based system.

FIG. 5 is a diagram of a cloud system for implementing the systems and methods described herein for tracking and auditing changes in a multi-tenant cloud system. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system, such as a system providing different functionality from security. In the cloud system 500, traffic from various locations (and various devices located therein) such as a regional office 510, headquarters 520, various employee's homes 530, mobile laptop 540, and user device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

§ 6.0 DNS AUGMENTED SECURITY

In an embodiment, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 502 are in the data path of connecting users. Another approach can include a passive approach to the data path. DNS is one of the most fundamental IP protocols. With DNS surrogation as a technique, it is proposed to use DNS for dynamic routing of traffic, per-user authentication and policy enforcement, and the like.

In conjunction with the cloud system 500 and/or the distributed security system 100, various techniques can be used for monitoring which is described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Example high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
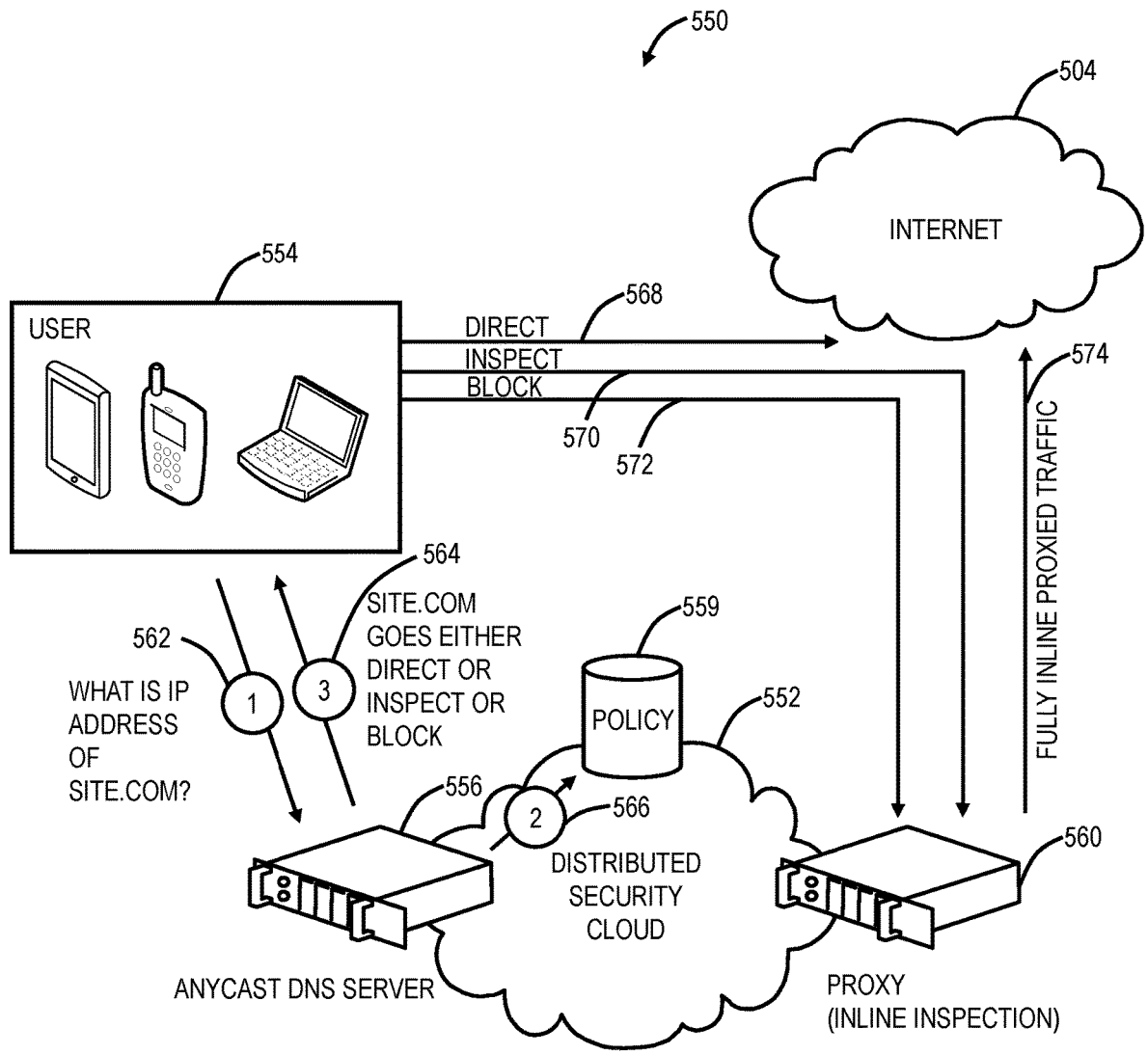
FIG. 6 is a network diagram of a network with a distributed security cloud providing DNS augmented security.

FIG. 6 is a network diagram of a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully in line proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§ 7.0 UNIFIED AGENT APPLICATION

Figure 7:
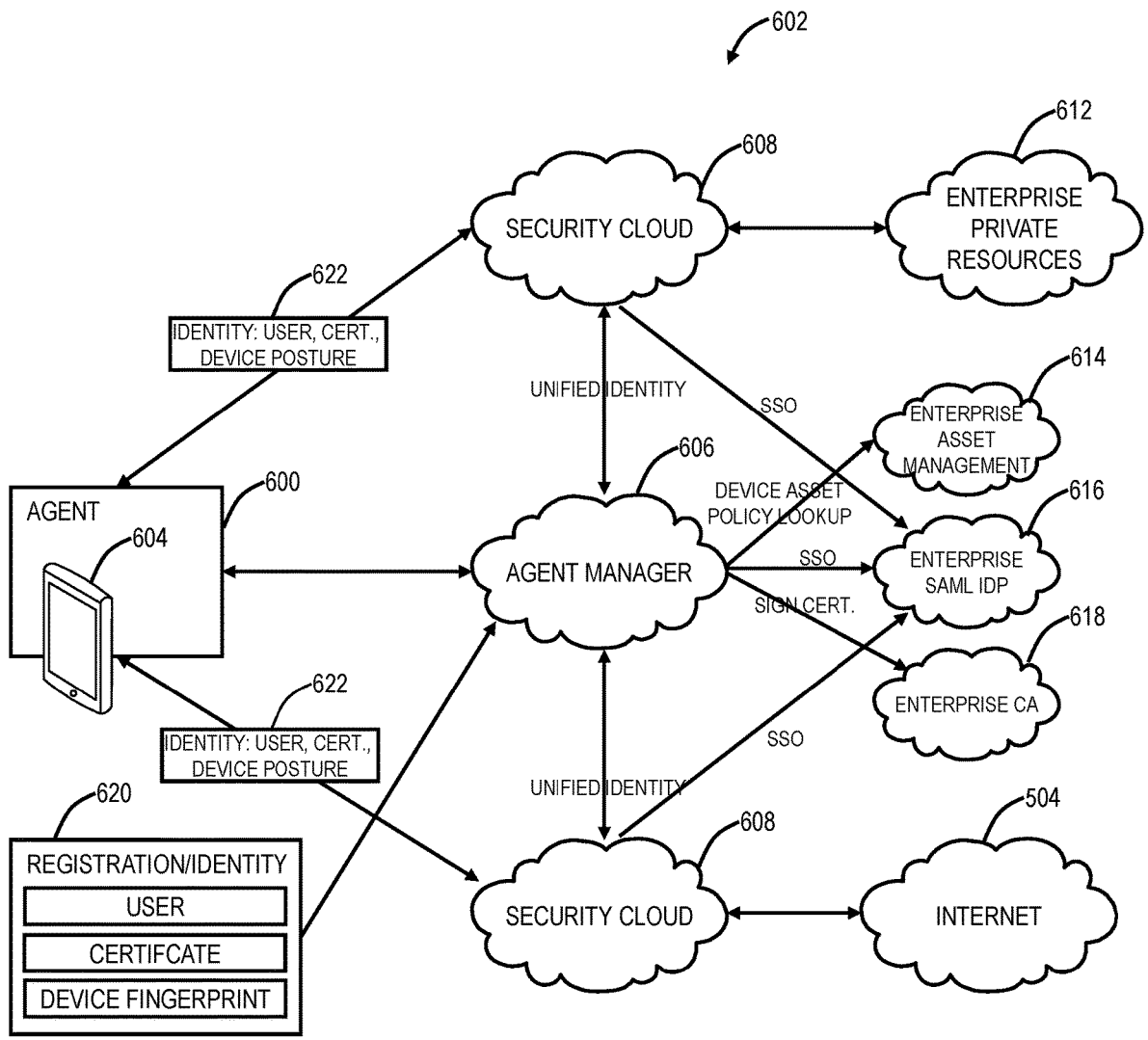
FIG. 7 is a network diagram of a unified agent application and associated connectivity and functionality in a network.

FIG. 7 is a network diagram of a unified agent application 600 and associated connectivity and functionality in a network 602. The unified agent application 600 is executed on a user device 604. The unified agent application 600 dynamically learns all available services, adapts to changing network environments, and provides a seamless and a secure network resource access to Internet and darknet hosted applications. This is achieved through dynamic evaluation of network conditions, enrollment to individual services, learning individual service protocols, creating a link-local network on the device 604, and establishing multiple secure tunnels to cloud services over this local network.

The unified agent application 600 is communicatively coupled to an agent manager cloud 606, and a security cloud 608. Note, the security cloud 608 can be the distributed security system 100, the cloud system 500, the distributed security cloud 552, etc. The unified agent application 600 enables communication to enterprise private resources 612 via the security cloud 608 and to the Internet 504 via the security cloud 608. The agent manager cloud 606 can communicate with enterprise asset management 614, an enterprise Security Assertion Markup Language (SAML) Identity provider (IDP) 616, and an enterprise Certificate Authority (CA) 618. The device 604 and the unified agent application 600 can perform a registration/identity 620 process through the agent manager cloud 606 where the user identity, the user's certificates, and a device fingerprint can uniquely identify the device 604. Once registered, the unified agent application 600 has an identity 622 which can include the user, certificates, device posture, etc. and which is shared with the security cloud 608.

The unified agent application 600 operates on a client-server model where an IT admin enables appropriate services for end users at a Cloud Administration Server (CAS) which can be part of an agent manager cloud 606, namely the enterprise asset management 614. Every client can make a unicast request to the agent manager cloud 606 (e.g., CAS) to discover all enabled services. On acknowledging the response, the client issues a request to authenticate to each service's cloud Identity Providers, the enterprise SAML IDP 616. Authentication can be multi-factor depending upon the nature of the service. On successful authentication, server contacts Mobile Device Management (MDM) or Inventory management provider to define access control rights for the device 604. Post authorization, the device 604 is successfully enrolled into the agent manager cloud 606 which tracks and monitors all behavior of the device 604.

Post-enrollment, the device 604 creates a link local network with a specific IP configuration, opens a virtual network interface to read and write packets and opens multiple listening sockets at custom ports to create secure tunnels to available services through the security cloud 608. On network changes, the device 604 dynamically evaluates reachability to preconfigured domains and depending upon the result it appropriately transitions all network tunnels, thus providing a seamless experience to the end user. Further, the device 604 also intelligently learns the conditions which are appropriate for setting up network tunnels to cloud services depending upon several network heuristics such as reachability to a particular cloud service.

§ 7.1 Unified Agent Application—Functionality

Generally, the unified agent application 600 support two broad functional categories—1) dynamic service discovery and access controls and 2) service availability. The dynamic service discovery and access controls include service configuration by the administrator, service discovery by the device 604, service acknowledgment and authentication, service authorization and enrollment, and the like. For service configuration by the administrator, the IT admin can provide cloud service details at a centralized knowledge server, such as part of the agent manager cloud 606, the enterprise asset management 614, etc. The cloud service details include the service type (e.g., Internet/intranet), network protocol, identity provider, server address, port and access controls, etc.

For service discovery by the device 604, the device 604 can issue a network request to a known Cloud Administrative Server (CAS) in the agent manager cloud 606 to discover all enabled services for a user. If a specific cloud server is not known a priori, the device 604 can broadcast the request to multiple clouds, e.g., through the agent manager cloud 606 communicating to the enterprise asset management 614, the enterprise SAML IDP 616, and the enterprise CA 618.

For the service acknowledgment and authentication, the device 604 acknowledges the response of service discovery and initiates the authentication flow. The device 604 learns the authentication protocol through the service discovery configuration and performs authentication of a configured nature at the enterprise SAML IDP 616. For the service authorization and enrollment, post successful authentication, the CAS, authorizes the device 604 and fetches the access control information by contacting an MDM/Inventory Solutions Provider. Depending on the user context and the nature of access, the CAS enrolls the device 604 into several cloud services and informs the cloud services that the user has been enrolled for access.

The service availability includes link local network setup, a traffic interceptor, and dynamic traffic forwarding tunnels to authorized services. The link local network setup, post enrollment, has the device 604 create a local network on the device 604 itself to manage various networking functionalities. For the traffic interceptor, the device 604 intercepts and evaluates all Internet traffic. Allowed traffic is tunneled to the cloud services such as in the security cloud 608 whereas rest of the traffic is denied as per enterprise policies. For the dynamic traffic forwarding tunnels to authorized services, depending upon the evaluation, the device 604 splits the traffic into the different tunnel to individual cloud services such as in the security cloud 608.

The unified agent application 600 is a single application that provides security connectivity to the Internet 504 and darknet hosted applications, such as the enterprise private resources 612. The unified agent application 600 communicates securely to the agent manager 606 which is controlled by an IT admin. The unified agent application 600 learns available services and authenticates with each service. Post proper enrollment, the unified agent application 600 securely connects to cloud services by means of network tunnels.

§ 7.2 Unified Agent Application—Workflow

Figure 8:
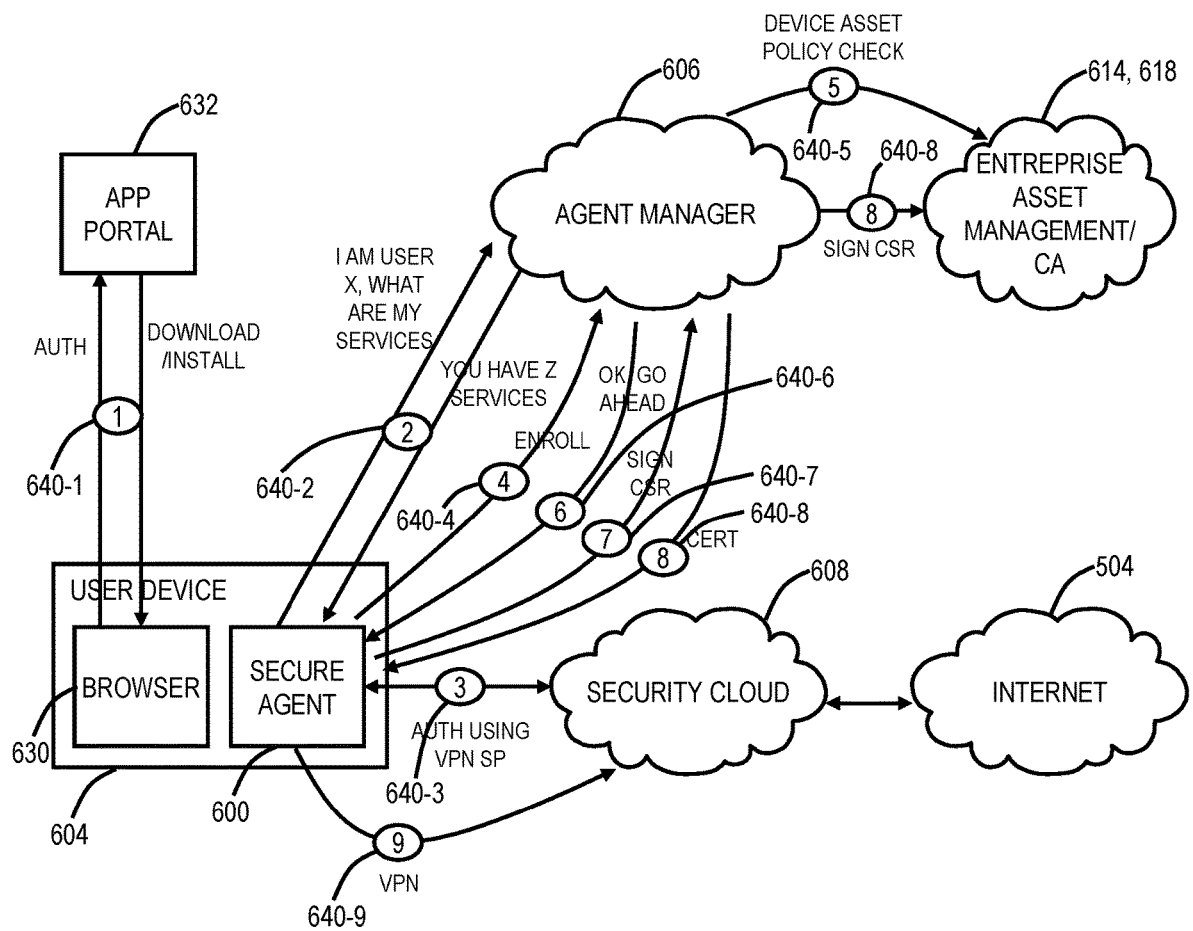
FIG. 8 is a network diagram of the workflow of the unified agent application in the network of FIG. 7.

FIG. 8 is a network diagram of the workflow of the unified agent application 600 in the network 602. The device 604 again executes the unified agent application 600, as well as a browser 630 (or some other application requesting network services). FIG. 8 illustrates example workflow. First, the device 604 includes authentication through an application portal 632 and download/install of the unified agent application 600 therefrom (step 640-1). Note, the application portal 632 can be a website, Apple's app store, Google play, Windows store, etc. Once installed, the unified agent application 600 communicates to the agent manager cloud 606 communicating identity and asking for available services ("I am User X, what are my services?") and the agent manager cloud 606 responds with the available services ("You have Z services") (step 640-2).

Next, the unified agent application 600 includes authentication using a VPN Service Provider (SP) with the security cloud 608 (step 640-3). The unified agent application 600 next enrolls the device 604 through the agent manager cloud 606 (step 640-4). The agent manager cloud 606 performs a device asset policy check with the enterprise asset management 614 (step 640-5). The agent manager cloud 606, upon successful check, provides the unified agent application 600 an affirmative response (step 640-6). The unified agent application 600 sends a Certificate Signing Request (CSR) to the agent manager cloud 606 (step 640-7) and the agent manager cloud 606 sends the CSR request to the enterprise CA and the certificate is returned to the unified agent application 600 (step 640-8). Finally, the unified agent application 600 enables VPN connectivity to the security cloud 608 (step 640-9).

Figure 9:
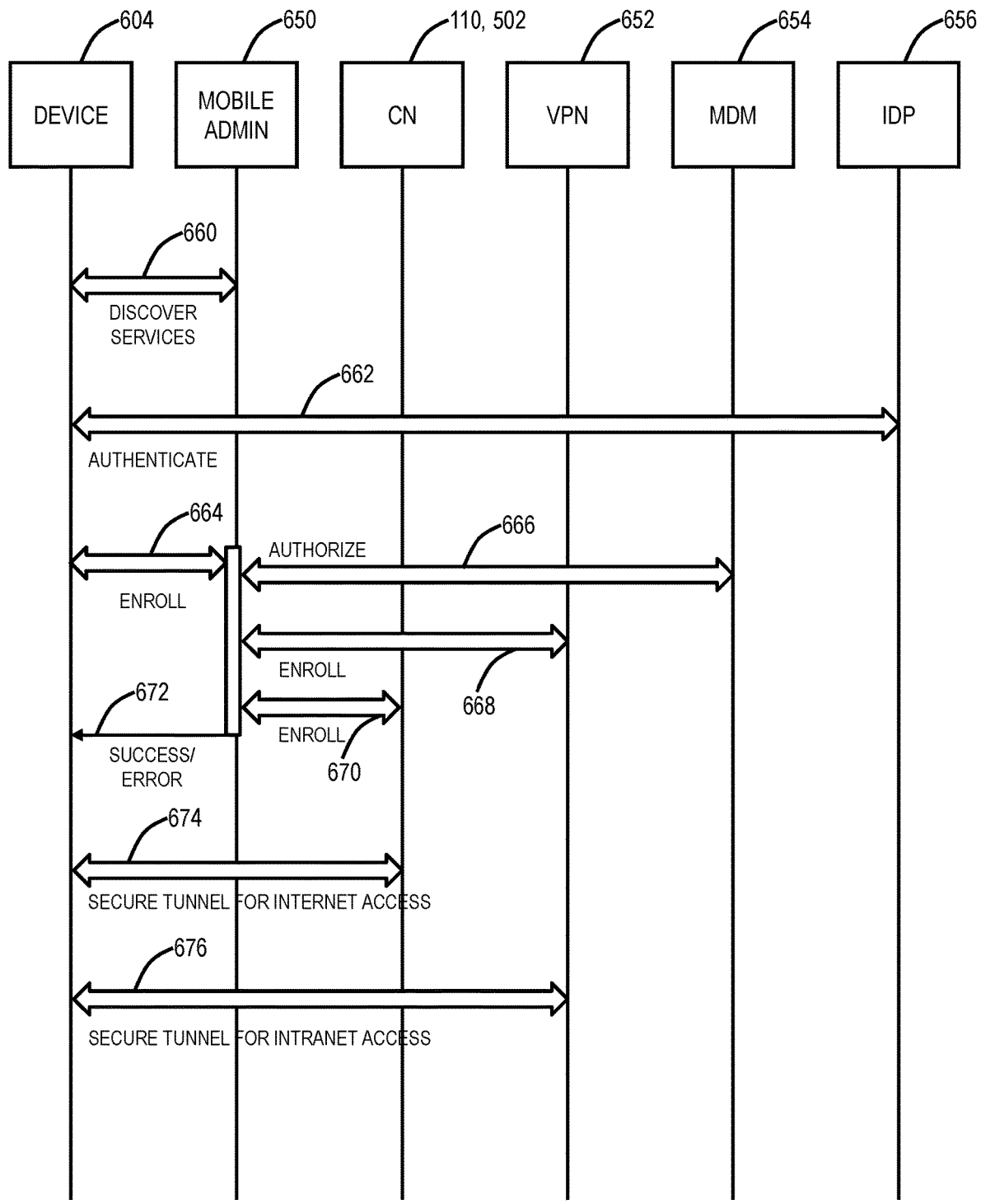
FIG. 9 is a flow diagram of an event sequence associated with the unified agent application in the network of FIG. 7.

FIG. 9 is a flow diagram of an event sequence associated with the unified agent application 600 in the network 602. The event sequence is shown between the device 604 executing the unified agent application 600, a mobile admin function 650 such as implemented through the agent manager cloud 606, a cloud node 502, a VPN node 652 such as through the security cloud 608, a MDM function 654 such as through the enterprise asset management 614, and an IDP function 656 such as through the enterprise SAML IDP 616. The device 604 discovers services with the mobile admin function 650 (step 660), and the device 604 is authenticated by the IDP function 656 (step 662). The device 604 enrolls in discovered services through the mobile admin function 650 (step 664).

The mobile admin function 650 is configured to authorize the services with the MDM function 654 (step 666) enroll in the services through the VPN node 652 (step 668) and the processing nodes 110/cloud nodes 502 (step 670). A success/error is provided by the mobile admin function 650 to the device 604. Subsequently, the device 604, through the unified agent application 600, accesses the services such as a secure tunnel for internet access through the processing nodes 110/cloud nodes 502 (step 674) or a secure tunnel for intranet access through the VPN node 652 (step 676).

§ 7.3 Unified Agent Application—Architecture

Figure 10:
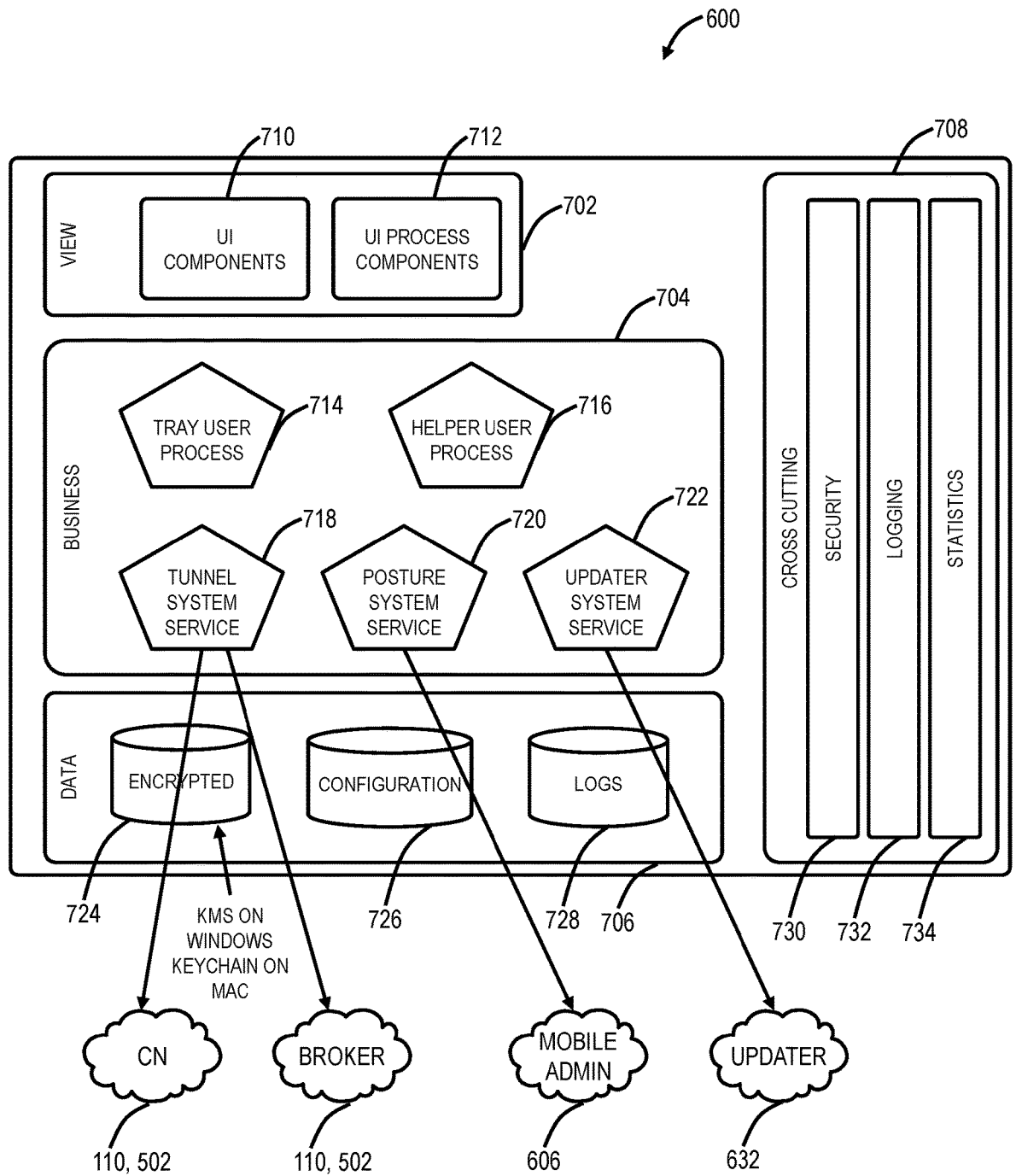
FIG. 10 is a logical diagram of functional components of the unified agent application.

FIG. 10 is a logical diagram of functional components of the unified agent application 600. The unified agent application 600 is configured to operate on the user device 604. The security cloud 608, e.g., through the distributed security system 100 or the cloud system 500, provides Internet security as well as cloud-based remote access to enterprise internal resources, through a VPN. These cloud services are designed and well suited for road warriors. Road warriors are the users who are accessing Internet and enterprise internal services from outside the corporate physical network perimeter, i.e., the mobile laptop 540 and/or the user device 542 in the cloud system 500. These are the users who are accessing Internet and Enterprise resources from home, airports, coffee shops and other external unsecured hotspots.

The unified agent application 600 provides authenticated and encrypted tunnels from road warrior devices 604 and, in some use cases, it even needs to be enforceable so that end users cannot disable the unified agent application 600. The VPN, which is the remote access service, also needs to be authenticated and encrypted tunnel from road warrior devices 604. Both of these solutions also need to provide feedback to the end user in the event that access was blocked due to security or compliance reasons. The following describes the architecture and design of the unified agent application 600 including an endpoint client architecture, backend changes, auto update and integration with the security cloud 608.

The unified agent application 600 includes logical components including view components 702, business processes and services 704, data 706, and cross-cutting functions 708. The view components 702 include User Interface (UI) components 710 and UI process components 712. The business processes and services 704 include a tray user process 714, a helper user process 716, a tunnel system service 718, a posture system service 720, and an update system service 722. The data 706 includes encrypted data 724, configuration data 726, and logs 728. The cross-cutting functions 708 are across the view components 702, the business processes and services 704, and the data 706 and include security 730, logging 732, and statistics 734.

The unified agent application 600 has a use goal of simplified provisioning of the proxy (for security through the security cloud 608 to the Internet 504) and the VPN (for access through the security cloud 608 to the enterprise private resources 612). That is, the unified agent application 600 allows the use of the distributed security system 100, the cloud system 500, the distributed security cloud 552, the security cloud 608, etc. as a proxy for Internet-bound communications. The unified agent application 600 further allows the use of the distributed security system 100, the cloud system 500, the distributed security cloud 552, the security cloud 608, etc. as a tunnel for Intranet-bound communications to the enterprise private resources 412. With the unified agent application 600 setting up a local network at the device 604, the unified agent application 600 can manage communications between the Internet and the Intranet, i.e., two of the main categories of cloud services—proxy to the Internet and tunnel to the Intranet. The unified agent application 600 further has objectives of simplified user enrollment in the proxy and tunnels.

In an embodiment, the unified agent application 600 is a native application. The common functionality is abstracted out and made into common libraries based on C or C++ so that it can be reused across different platforms (e.g., iOS, Android, etc.). Example functionality: Traffic forwarding tunnels, local proxy, authentication backend, logging, statistics, etc. The UI components 710 and UI process components 712 can be platform dependent. Also, the unified agent application 600 is designed and implementable such that other third party VPN applications if configured by the enterprise, can be used concurrently.

The app portal 632 enables installation of the unified agent application 600 on the device 604. For example, an admin may be able to push and install the unified agent application 600 to the device 604 using remote-push mechanisms like GPO, MDMs, etc. Additionally, the user can download the unified agent application 600 if they have access to installation file and install on their own. The unified agent application 600 supports automatic updates without impacting the user's Internet experience. If a problem is encountered, then it should roll back to previously successful state or fail open. The unified agent application 600 can have a security check to ensure that it is not tampered and updated from a right source with a hash match with a source hash when upgrading.

Figure 11:
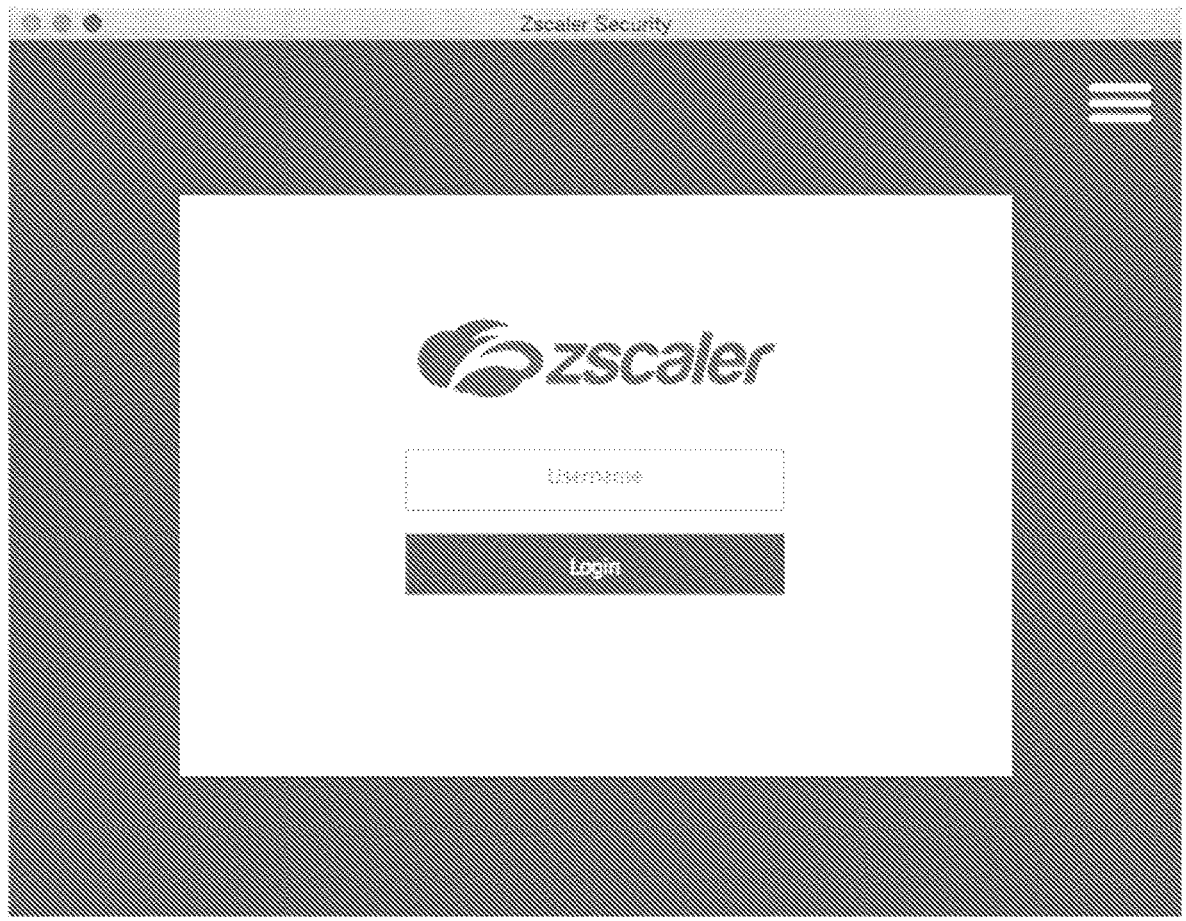
FIG. 11 is a screen shot of a login screen of the unified agent application.

The user is able to log into the unified agent application 600 such as with a User ID and password, as illustrated in FIG. 11. Once the user sends their User ID through the unified agent application 600 to the agent manager cloud 606, the security cloud 608, and/or the app portal 632, the app portal 632 can determine the company's authentication mechanism, such as through a lookup in the enterprise asset management 614, and validate password through the enterprise CA 618.

Through the unified agent application 600, a user can be authenticated to the proxy or the VPN through the security cloud 608. For authentication of the user to the proxy, using SAML, the user is able to log into the unified agent application 600 by using their user ID and transparent SAML authentication thereafter, including SAML certificate. The app portal 632 shall determine that an organization is using SAML for authentication through the enterprise CA 618 and redirect to the enterprise SAML IDP 616 to get SAML assertion and use it to authenticate the user.

For authentication of the user to the tunnel, using SAML, the user is able to log into the unified agent application 600 by just using their user ID and based on the user ID, the unified agent application 600 shall redirect the user for authentication to enterprise SAML IDP 616 and SAML assertion shall be sent. The VPN service shall validate SAML assertion; if the assertion is valid, then the unified agent application 600 shall collect hardware parameters like device serial number, model number, etc. and create CSR. The CSR shall be signed by the enterprise CA 618 and the certificate shall be pushed to the unified agent application 600. The unified agent application 600 shall install the certificate to KMS/keychain and save assertion.

After the user has been successfully authenticated, the user shall be enrolled in the proxy service and user's traffic forwarding profile shall be downloaded from unified agent application 600 including Secure Sockets Layer (SSL) certificates and exceptions. The unified agent application 600 shall indicate that user is connected to security cloud 608, and app statistics shall be populated.

After the user has successfully authenticated (including transparent authentication), the user shall be enrolled with a VPN service and the VPN broker info shall be downloaded by the unified agent application 600 and the VPN tunnel shall be established. The unified agent application 600 can support captive portal detection to fail open when users are behind a captive portal to allow connection to captive portal.

The unified agent application 600 can forward enterprise internal traffic from the device 604 to the VPN. The unified agent application 600 can recognize when a user goes to an internal app that is provisioned with the VPN service. The unified agent application 600 shall auto enable a tunnel to the VPN service when the user tries connecting to an internal app. The proxy service can always be enforced, and the user is not able to remove it by switching off tunnel or removing the unified agent application 600. Without the proxy solution enforced, the user is not able to access the Internet and would be prompted to restart the web security service, via the unified agent application 600.

The VPN is an on-demand service; unlike the proxy service that shall be enforceable by default, so the user can enable/disable the VPN at will without any password requirements. Once the user logs into the VPN service using a 'Connect,' the same button shall be labeled 'Disconnect' and user shall be able to disconnect the VPN service with a single click. Every time user disconnects with VPN service. The VPN service can be auto-disabled if the user puts their system to sleep mode or there is inactivity (no packets exchanged) after x minutes (x shall be configurable in the VPN settings).

The admin can turn off the proxy service with a single client from an admin UI for a user, all users, or some subset of users. This does not remove the unified agent application 600 from the device 604. A user may be able to disable the proxy service, provided they have the authority and credentials. The unified agent application 600 can provide service related notifications to the user. For example, the unified agent application 600 can provide notifications such as push alerts or the like as well as contain a notification area for a single place to show all notifications that are generated by the proxy service and the VPN service. This shall also include app notifications including configuration updates, agent updates, etc. The user shall be able to clear notifications as well filter notifications from this screen. This shall include a filter for VPN/Proxy, blocked, cautioned, quarantine actions.

§ 7.4 Unified Agent Application—Admin Workflow

Figure 12:
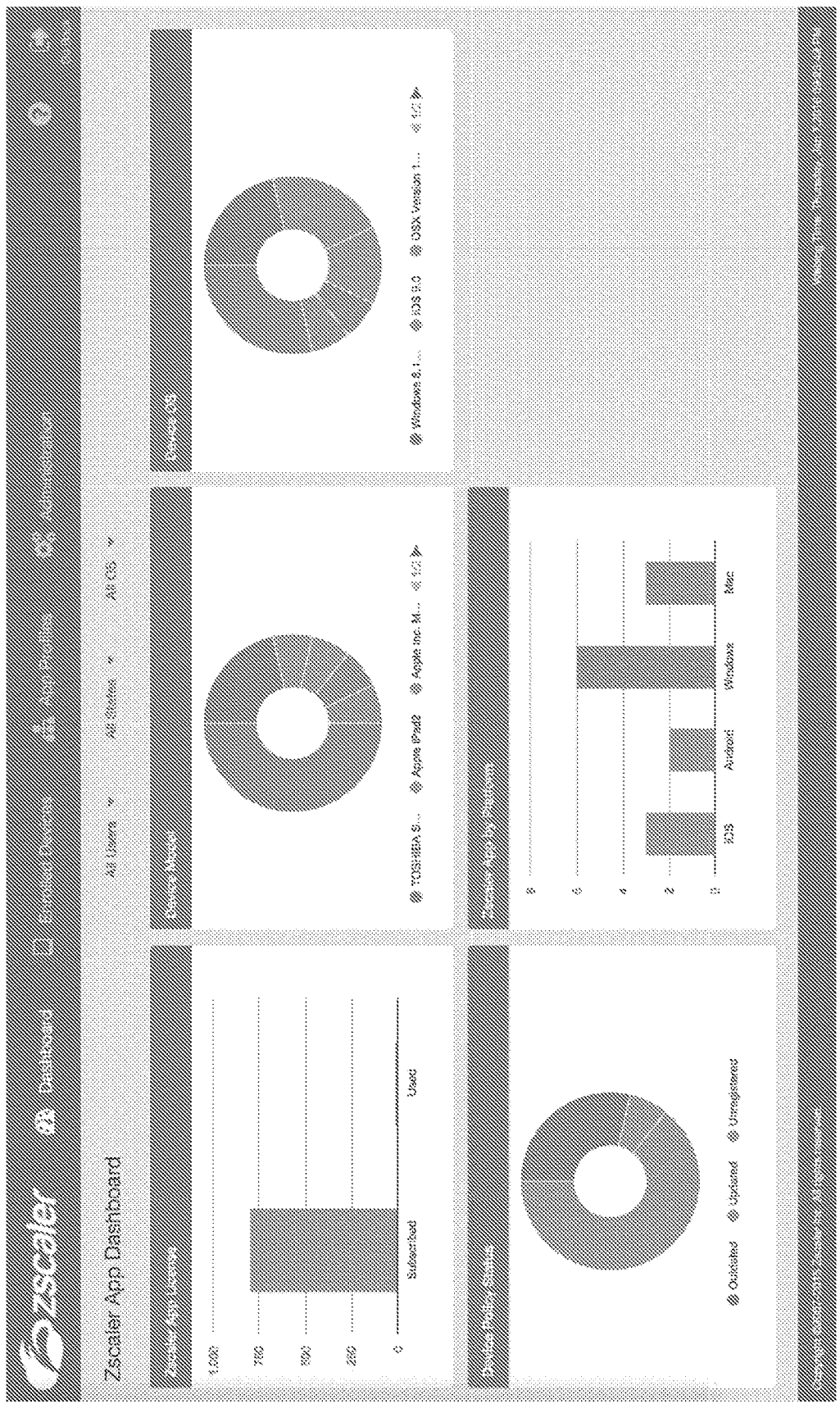
FIG. 12 is a screen shot of an admin dashboard for the unified agent application.
Figure 13:
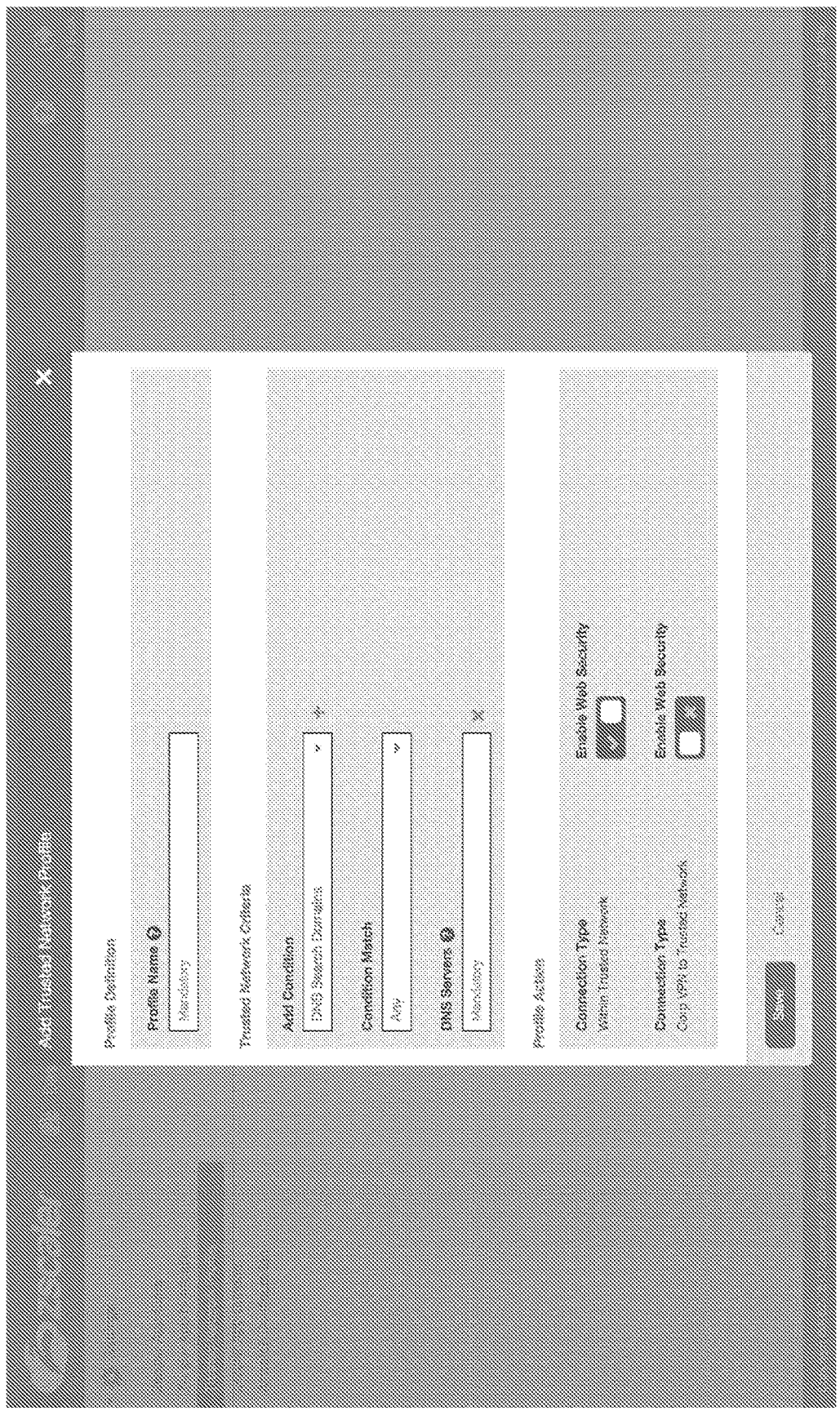
FIG. 13 is a screen shot of a network evaluation configuration for the unified agent application.

FIGS. 12 and 13 are screen shots of an admin dashboard (FIG. 12) and a network evaluation configuration (FIG. 13) for the unified agent application 600. An enterprise administrator (admin) can configure the unified agent application 600 for associated users.

Configurable parameters generally include the Acceptable Use Policy (AUP), automatic updates, enforcement parameters (e.g. logout password to allow the user to log out of the unified agent application 600, uninstall password to allow the user to uninstall the unified agent application 600, etc.). For the proxy service, the configurable parameters can include Proxy Auto-Config (PAC) per user, group, etc. Also, the proxy service can be enabled for all users, for subsets of users, and/or for individual users. For the VPN service, the configurable parameters can include certificates, IDP servers, ports and protocols, and the like.

The admin dashboard provides a centralized view for all the users of the unified agent application 600, including deployed licenses, device 604 type and Operating System (OS), device policy status, platform type, etc. The network evaluation configuration allows the admin to add a trusted network profile and perform other configurable parameters with the proxy service and the VPN service.

§ 7.5 Unified Agent Application—User Workflow

Again, the unified agent application 600 is executed on the device 604. For authentication, the user enters a User ID in the unified agent application 600, such as userid@domain. Subsequently, the unified agent application 600 is configured to discover the services enabled—proxy service and VPN services based on userid@domain. The user authenticates with the presented services, i.e., proxy service, VPN services, and combinations thereof. The unified agent application 600 is auto provisioned for the authenticated service by downloading the service specific configuration. The unified agent application 600 performs the following during VPN enrollment—get the User/Device certificate signed by an Enterprise Intermediate Certificate. This Intermediate Certificate will be same which will be used for signing Assistants. The unified agent application 600 also will pin hardware signatures/fingerprints to the Certificate and user, e.g., Storage Serial ID (Hard Drive Serial ID), CPU ID, Mother Board Serial ID, BIOS serial number, etc.

§ 7.6 Unified Agent Application—Authentication and Enrollment Protocol

Figure 14:
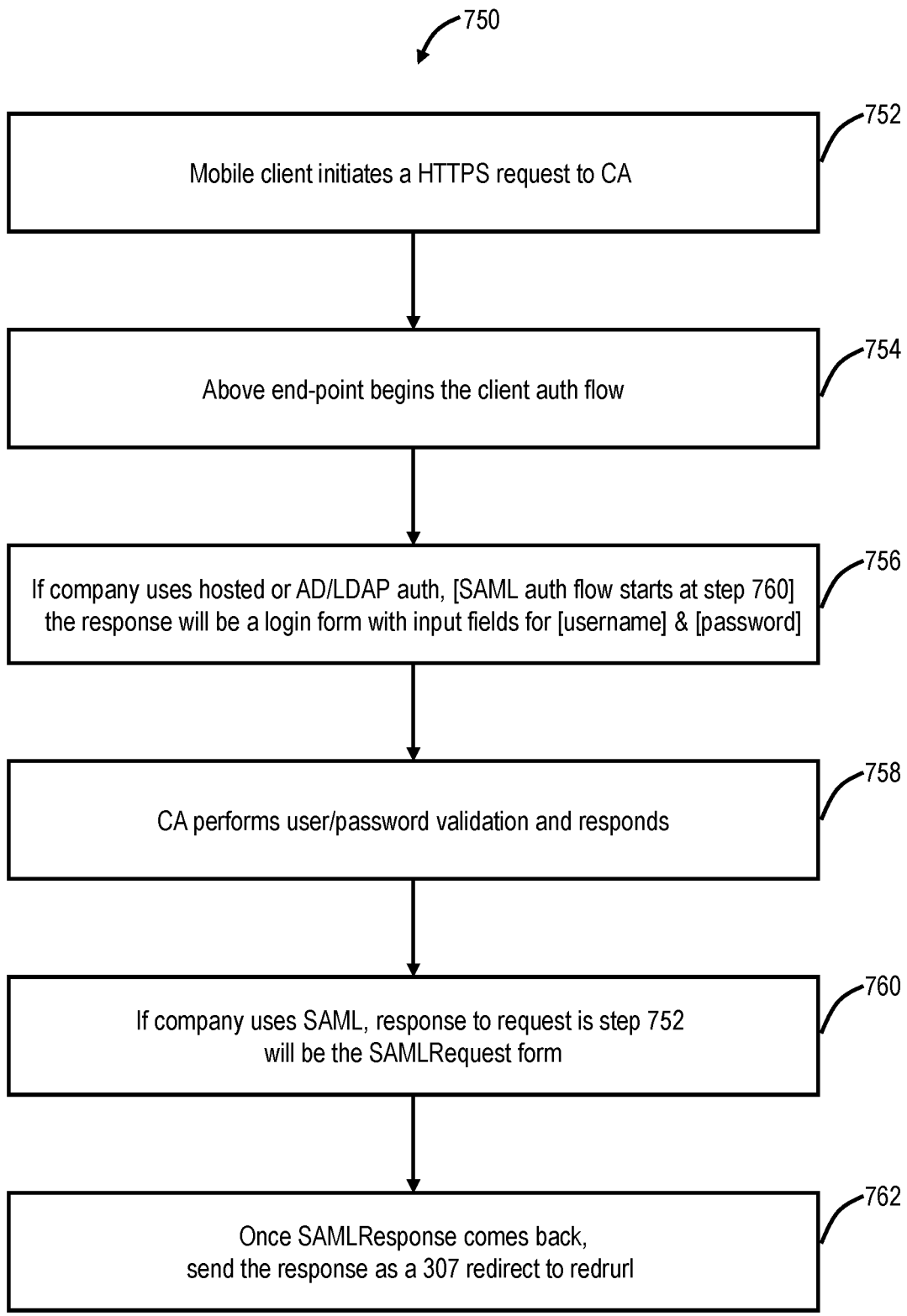
FIG. 14 is a flowchart of a proxy authentication method to the security cloud.

FIG. 14 is a flowchart of a proxy authentication method 750 to the security cloud 608. For authentication in the proxy service, conventionally, devices 604 can use proxy authentication to register to the security cloud 608. This is not truly reliable as it depends on location/location-authentication policy/VPN and other such factors to work correctly. To simplify this flow, the following new flow can be used with the unified agent application 600 for the method 750. First, the mobile client device 604 initiates an HTTPS request to a CA (e.g., the enterprise CA 618) (step 752). For example, this can be as follows:

```
login.zscaler.net/clstart?version=1&_domain=nestle.com&redrurl=<url-encoded-url-with-schema>
```

If the domain is invalid or if the redrurl is missing, CA will reset the connection.

Above end-point begins the client auth flow (step 754). The provided domain is the company that requires the auth. The CA looks up the domain to find the company and their auth mechanism. If the company uses hosted or Active Directory (AD)/Lightweight Directory Access Protocol (LDAP) authentication [SAML auth flow starts at step 760], the response will be a login form with input fields for [username] & [password] (step 756). The form is submitted via POST to the CA at a below end-point:

```
https://login.zscaler.net/clicred. The HTTP content may look like below
POST /clicred
Host: login.zscaler.net
Content-Length: xyz username=xyz@nestle.com&password=123456&redrurl=<url-encoded-posturl-with-schema>
```

Next, the CA performs user/password validation and responds with the message explained in step 764 (step 758). If the company uses SAML, response to the request in step 752 will be the SAMLRequest form. The SAMLRequest form will auto-submit to the IDP. Once auth completes, the CA gets control back with the identity of the user. Once SAMLResponse comes back, send the response as a 307 redirect to redrurl with a below format

```
Location: zsa://auth[?token=encrypted-cookie&...] to be appended.
307 query params
token= (on success)
ecode= (on error)
emsg= (on error)
On error, send the same redrurl with below format
zsa://auth?ecode=<code>&emsg=<message>
```

Figure 15:
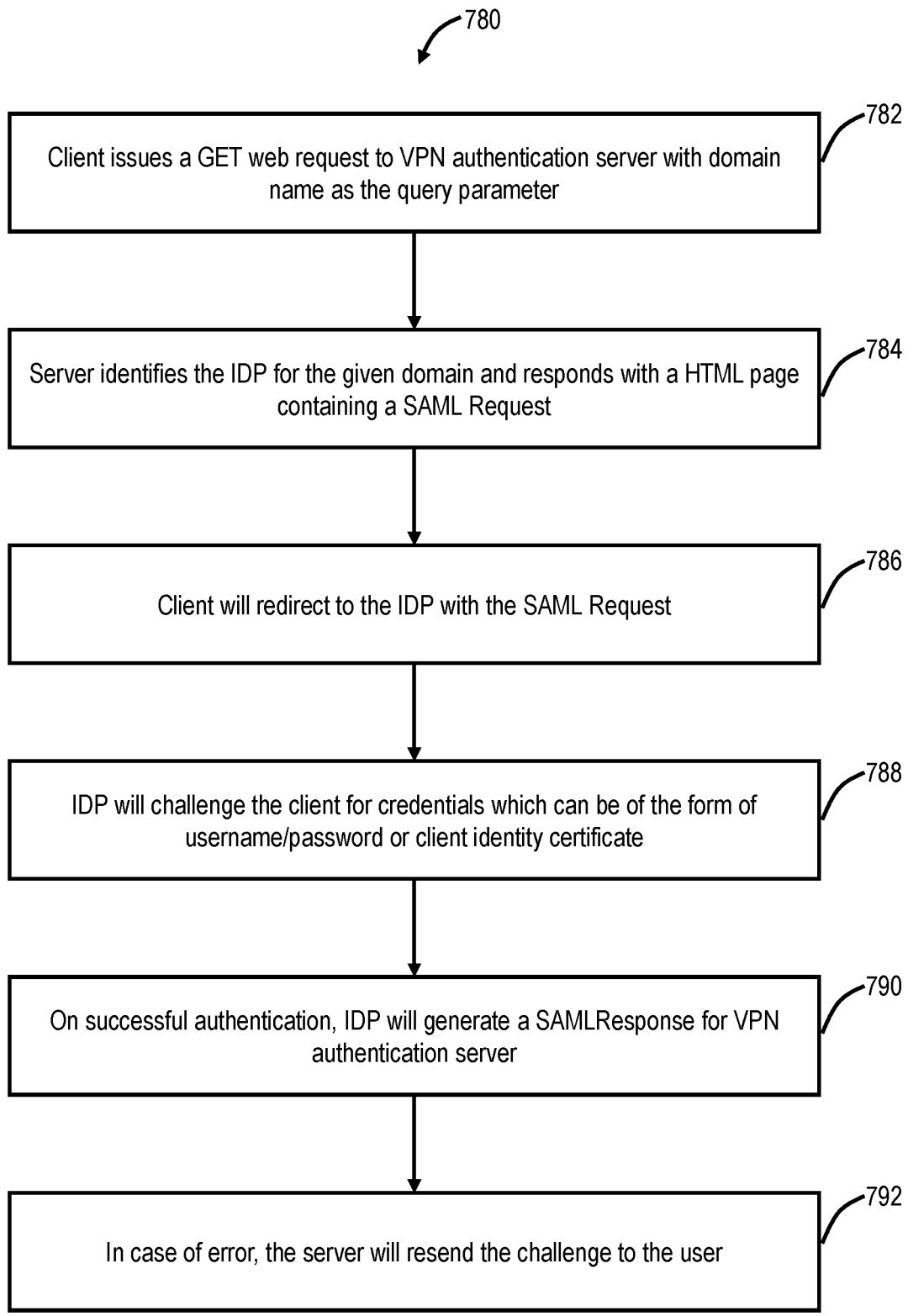
FIG. 15 is a flowchart of a VPN authentication method to the security cloud.

FIG. 15 is a flowchart of a VPN authentication method 780 to the security cloud 608. The client (device 604) issues a GET web request to the VPN authentication server with domain name as the query parameter (step 782), such as:
GET //<auth-server>?domain=mockcompany.com
The server identifies the IDP for the given domain and responds with a Hypertext Markup Language (HTML) page containing a SAML Request (step 784). The client will redirect to the IDP with the SAML Request (step 786). The IDP will challenge the client for credentials which can be of the form of username/password or client identity certificate (step 788). On successful authentication, IDP will generate an SAMLResponse for the VPN authentication server (step 790). The client will record the SAMLAssertion for future tunnel negotiation. In the case of error, the server will resend the challenge to the user (step 792).

Figure 16:
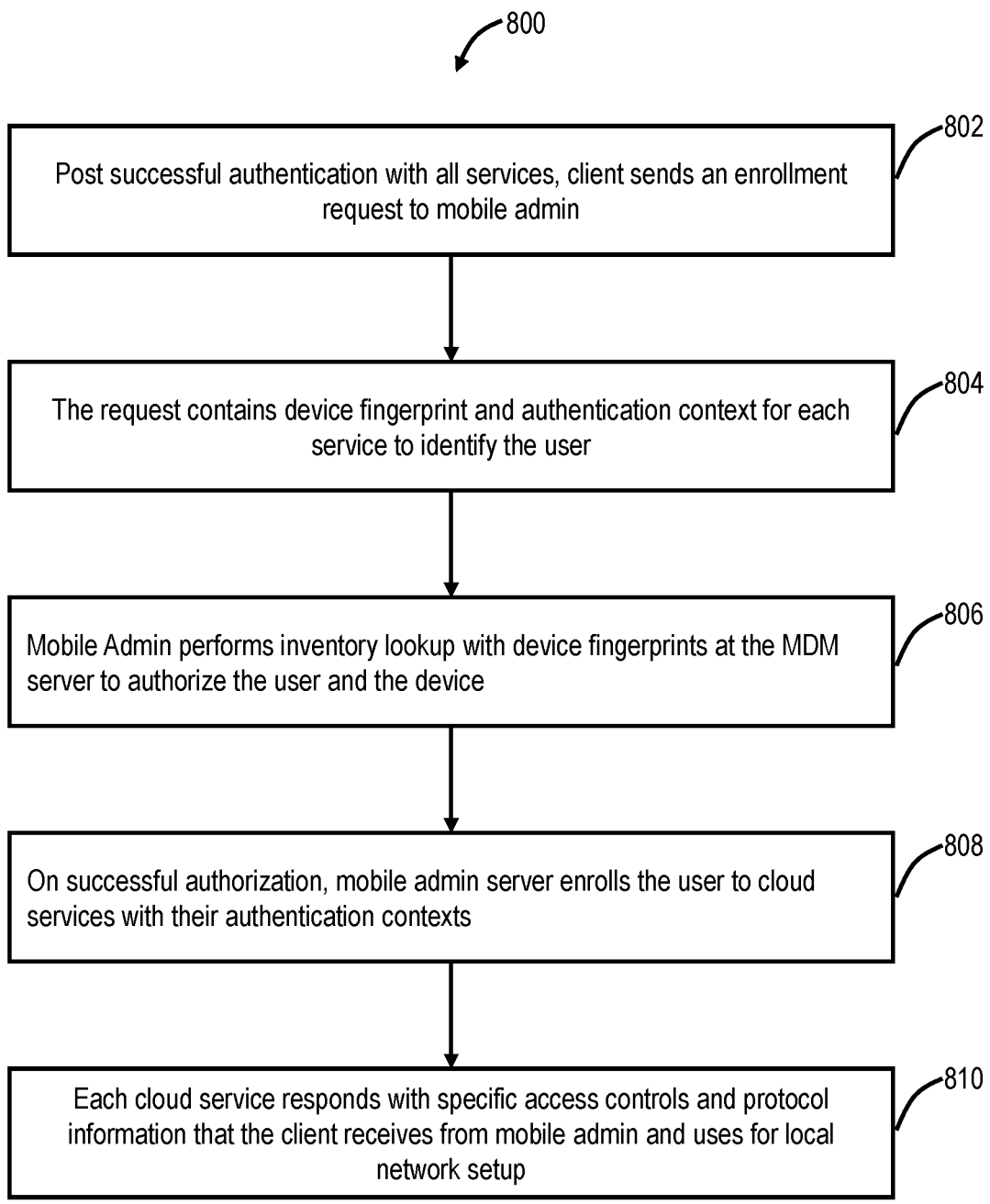
FIG. 16 is a flowchart of a device enrollment method for the client device and the unified agent application.

FIG. 16 is a flowchart of a device enrollment method 800 for the client device 604 and the unified agent application 600. Post successful authentication with all services, in this case, the proxy services and the VPN services, the client sends an enrollment request to mobile admin (Cloud Administrative Server CAS) (step 802). The request contains device fingerprint and authentication context for each service to identify the user (step 804). For example, the security cloud 608 can use cookies, and the VPN can use SAMLAssertion for the authentication context. The mobile admin (agent management cloud 606) performs inventory lookup with device fingerprints at the MDM server to authorize the user and the device 604 (step 806). On successful authorization, the mobile admin server enrolls the user to cloud services with their authentication contexts (step 808). Each cloud service responds with specific access controls and protocol information that the client receives from mobile admin and uses for local network setup (step 810).

§ 7.7 Unified Agent Application—Traffic Interception and Splitting

Again, in order to protect Internet-bound traffic and simultaneously access Enterprise specific Intranet traffic, the device 604 needs to connect through multiple applications. Again, it is not straightforward for users to configure these applications in different networks and different VPN and proxy solutions arise compatibility issues when operating simultaneously. The unified agent application 600 is designed to solve all these issues. The unified agent application 600 handles both proxy (Internet-bound) traffic, and Enterprise Intranet bound traffic. The unified agent application 600 provides secure access to Organizational internal resources when the user is outside of the enterprise network. For Internet-bound traffic, it will forward traffic to the processing node 110 or the cloud node 502, and for Intranet bound traffic, it will forward traffic to a VPN (Broker) or direct if the user is inside the organization network.

The unified agent application 600 is configured to intercept all traffic, specifically to intercept all Transmission Control Protocol (TCP) traffic and DNS traffic before it goes out through the external network interface in the device 604. The unified agent application 600 can intercept other types of traffic as well, such as User Datagram Protocol (UDP). The unified agent application 600 is configured to split traffic at the device 604, i.e., based on a local network configured at the device 604. Split traffic can be as follows: if the VPN service is configured by admin, traffic destined to internal hostnames (configured/provided by company admin) will go to the VPN (broker), if the proxy service is configured by admin, rest of 80/443 traffic will go to the security cloud 608 or will go direct based on PAC file configured by admin, and the remaining traffic will go directly. The unified agent application 600 is configured to send VPN traffic direct for trusted networks (organization's internal network). The unified agent application 600 can also coexist with other VPN clients, i.e. it does not intercept the traffic targeted for those interfaces by specific routes.

Thus, the unified agent application 600 is configured to intercept all traffic at the IP layer for the device 603 or other VPN client's default route. Then, the unified agent application 600 is configured to split traffic to the VPN [for darknet hosted applications], Proxy [for internet-bound cloud services] or Direct [for uninspected traffic] at both the IP or Transport layer.

Figure 17:
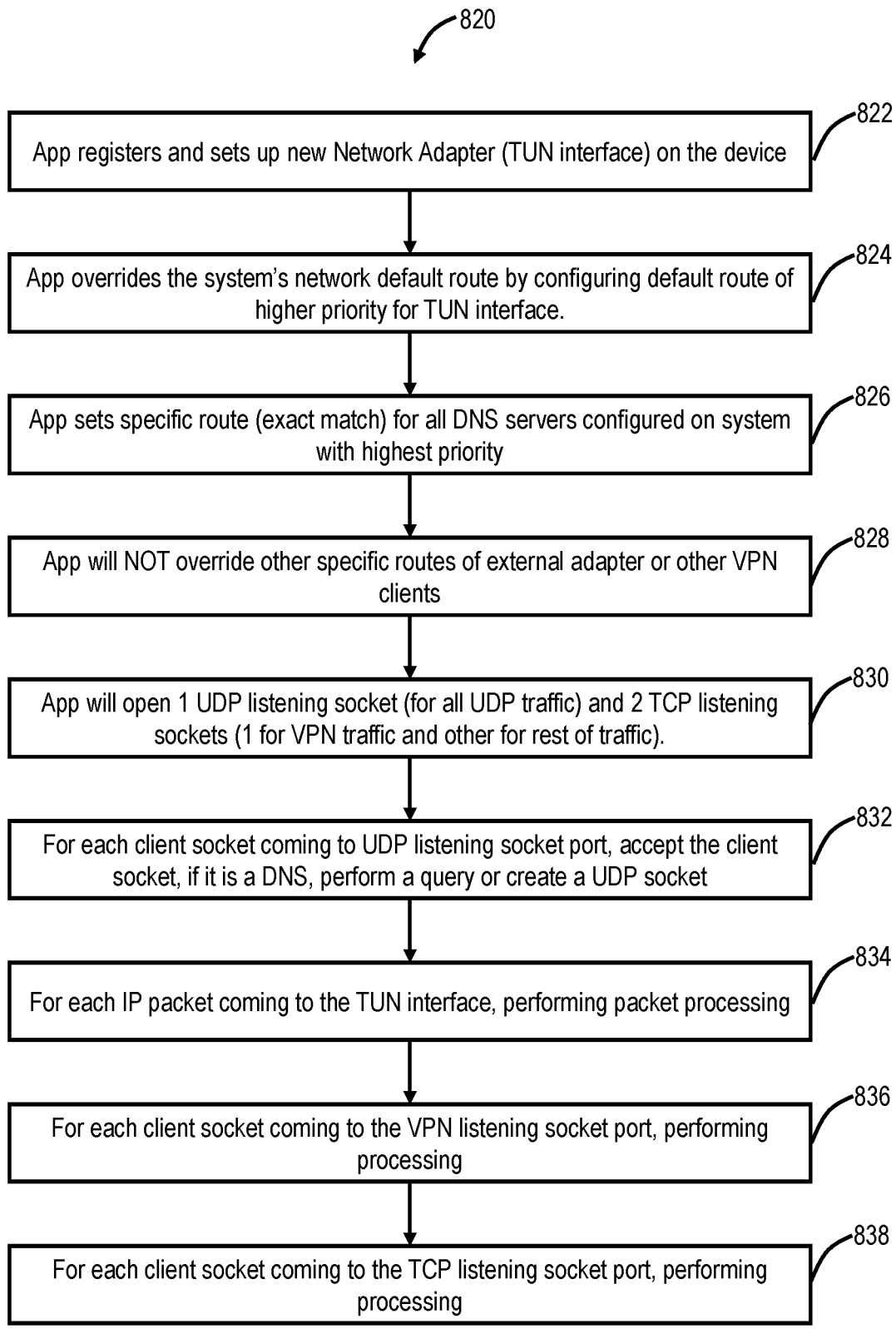
FIG. 17 is a flowchart of a traffic interception method implemented through the unified agent application.

FIG. 17 is a flowchart of a traffic interception method 820 implemented through the unified agent application 600. The unified agent application 600 registers and sets up a new Network Adapter (TUN interface) on the device (step 822). The unified agent application 600 overrides the device's network default route by configuring the default route of higher priority for the TUN interface (step 824). The unified agent application 600 sets specific route (exact match) for all DNS servers configured on the device 604 with the highest priority (step 826). The unified agent application 600 will not override other specific routes of external adapter or other VPN clients (step 828). The unified agent application 600 will open one UDP listening socket (for all UDP traffic) and two TCP listening sockets (one for VPN traffic and the other for rest of traffic) (step 830).

For each client socket coming to the UDP listening socket port, the unified agent application 600 includes accepting the client socket, if it is a DNS (port 53), a query is performed; else a UDP socket is created (step 832). The query includes if hostname matches one configured by admin for the VPN, the unified agent application 600 will create a local DNS response packet with address a.b.c.d, else it will create a UPD socket, bind it to external Interface and send the DNS packet to the original DNS server, and the response is written back to the client socket. For creating the UDP socket, it is bound to an external interface, a request packet is sent to the original destination server, and a response is written back to the client socket.

For each IP packet coming to the TUN interface, packet processing is performed (step 834). Here, if the packet's source port is equal to any of the unified agent application 600 listening socket's port then, get value corresponding to the packet destination port from the mapping table and replace packet source port with this value, else add a key-value entry <source port, destination port> to a mapping table and replace packet's destination port as per the following rules. If the protocol is UDP, replace with UDP listening socket port, if the protocol is TCP and destination address is a.b.c.d, replace with the VPN listening socket port, else replace with the second TCP listening socket port. Next, swap the source and destination IP addresses, compute IP and TCP/UDP checksums and overwrite original checksums in the packet, and write modified packet to the external interface.

For example, assume x.x.x.x is the IP address of the TUN interface and zz is the local listening socket port, the following illustrates an example of packet processing:

| Original Packet | Modified Packet |
|---|---|
| Request packet from client app: Src: x.x.x.x:xx Dest: y.y.y.y:yy | Src: y.y.y.y:xx Dest: .x.x.xx:zz Entry added to mapping table: <xx, yy> |
| Response packet from listening socket: Src: x.x.x.x:zz Dest: y.y.y.y:xx | Entry fetched from mapping table for key xx is yy Src: y.y.y.y:yy Dest: x.x.x.x:xx |

Next, for each client socket coming to the VPN listening socket port, processing is performed (step 836). The processing includes accepting the client socket, if the connection to the VPN is not there, create a socket for the VPN server, bind it to the external interface and connect and authenticate to the VPN; read request data from the socket and write it to the VPN server socket according to VPN protocol, and read response data from VPN socket and write it back to client socket.

For each client socket coming to the second TCP listening socket port, processing is performed (step 838). The processing includes accepting the client socket, if original destination port is 80/443, if the host/IP/URL is bypassed in a PAC file, then create new socket direct to destination server/port, else create new socket (or reuse existing socket) to the security cloud 609 and send connect request for the destination IP and port, else create new socket direct to destination server/port. Once the socket in connected, write request data on it, and when a response is available, write it back to the client socket.

Figure 18:
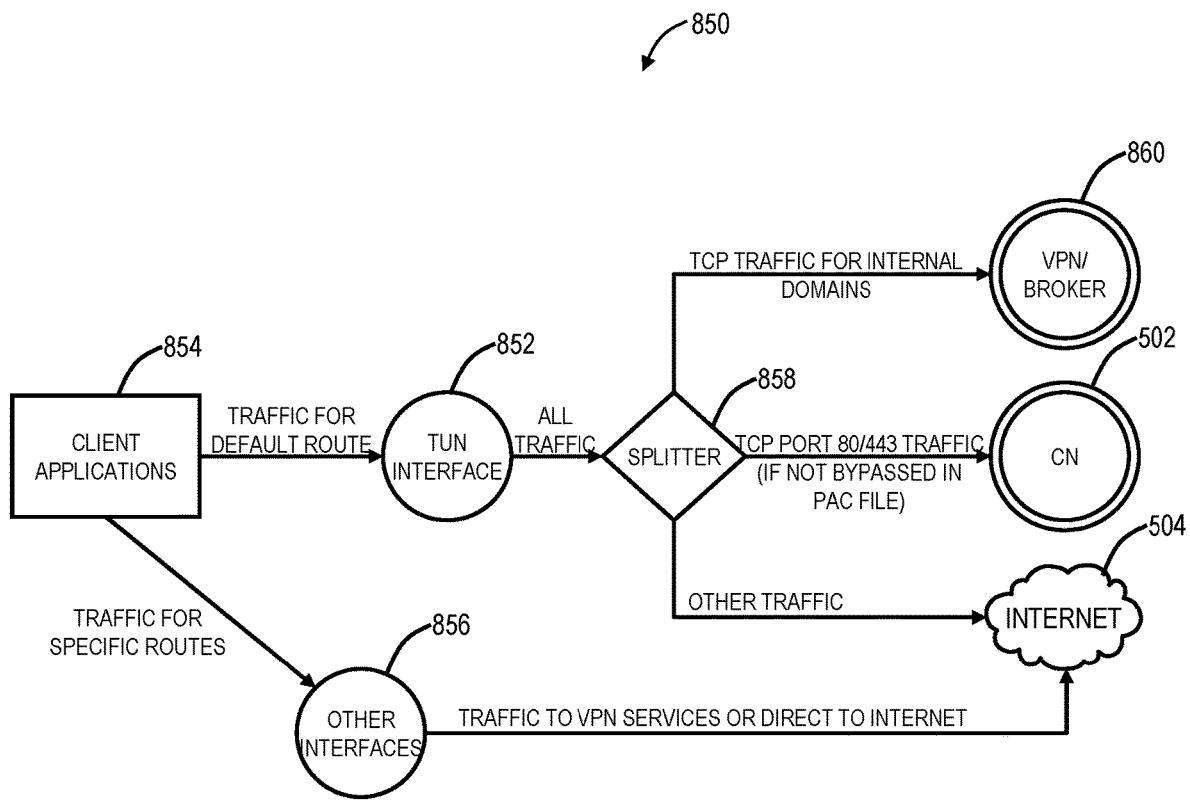
FIG. 18 is a flow diagram of traffic interception and splitting using the unified agent application.

FIG. 18 is a flow diagram of traffic interception and splitting 850 using the unified agent application 600. Again, the unified agent application 600 creates and operates a tunnel (TUN) interface 852 on the device 604. The device 604 includes one or more client applications 854, which can be any program or service executable on the device 604 which requires access to the network interface on the device 604. Traffic for the default route from the client applications 854 is sent to the TUN interface 852, but traffic for specific routes can be sent to other interfaces 856, separate from the TUN interface, for direct connectivity to the Internet 504, such as via VPN services or direct.

The TUN interface 852 splits 858 all traffic. TCP traffic for internal domains is sent to a VPN/broker server 860, TCP port 80/443 traffic is sent to the security cloud 608 for a proxy such as to the processing node 110 or the cloud node 502. Finally, other traffic can be sent directly to the Internet 504. In this manner, the TUN interface 852 operates a local network at the device 604.

Figure 19:
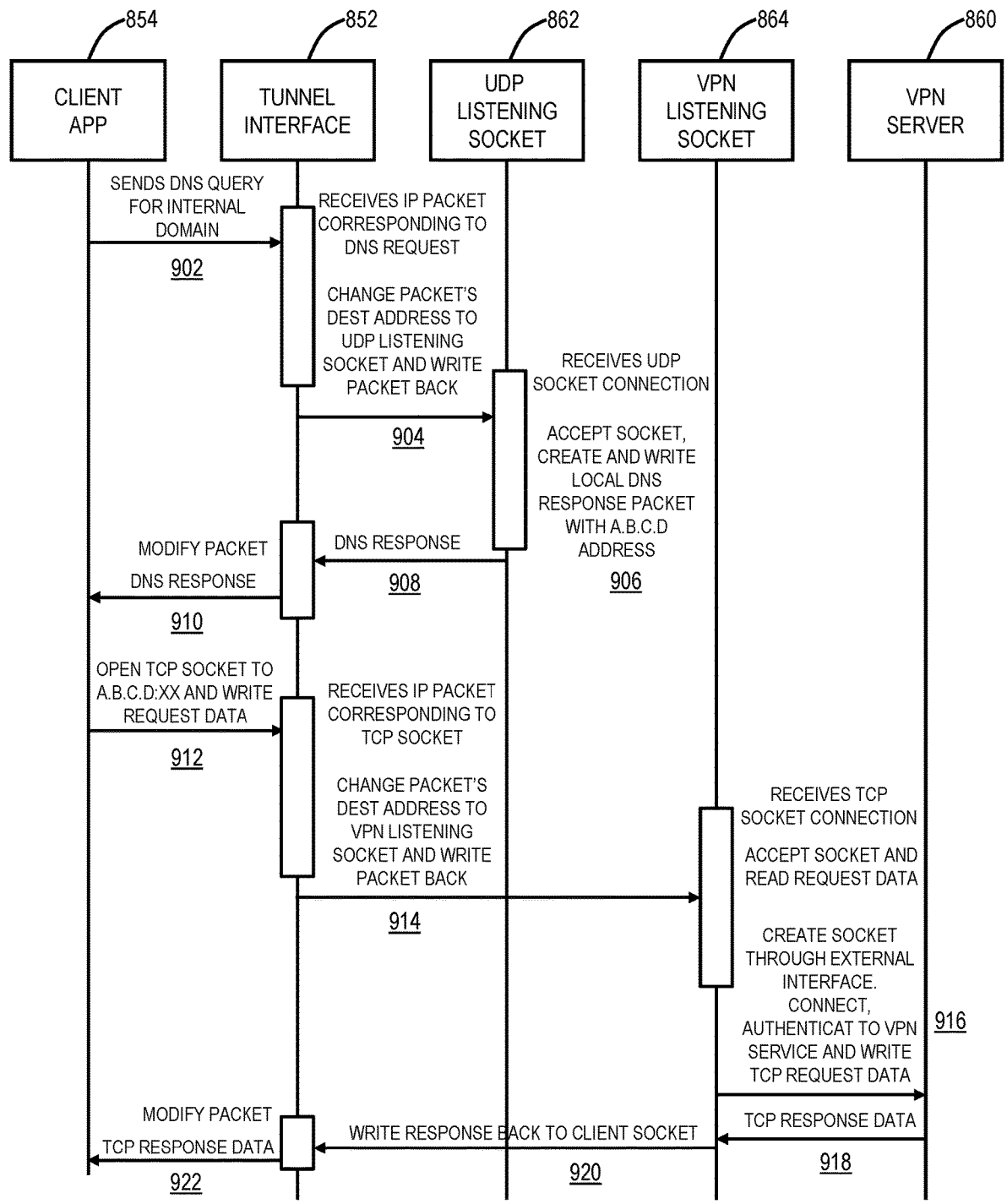
FIG. 19 is a flow diagram of example functionality of client applications, the TUN interface, sockets, and the VPN server for the interception and splitting using the unified agent application.

FIG. 19 is a flow diagram of the example functionality of client applications 864, the TUN interface 852, sockets 862, 864, and the VPN/broker server 860 for the interception and splitting 850 using the unified agent application 600. Specifically, FIG. 19 illustrates activity between the client applications 864, the TUN interface 852, a UDP listening socket 862, a VPN listening socket 864, and the VPN/broker server 860. First, the client application 854 sends a DNS query for an internal domain (step 902). The TUN interface 852 receives the IP packet corresponding to the DNS request and changes the packet's destination to the UDP listening socket 862 and writes the packet back (step 904). The UDP listening socket 862 receives the UDP socket connection, accepts the socket, creates and writes a local DNS response packet with A.B.C.D address (step 906). The DNS response is sent from the UDP listening socket 862 to the TUN interface 852 (step 908) and modified and sent back to the client application 854 (step 910).

Next, the client application 854 opens a TCP socket to A.B.C.D:XX and writes request data (step 912). The TUN interface 852 receives the IP packet corresponding to the TCP socket and changes the packet's destination address to the VPN listening socket 864 and writes the packet back (step 914). The VPN listening socket 864 receives the TCP socket connection, accepts the socket and read request data, and creates the socket through an external interface to connect and authenticate to the VPN server 860 and write TCP request data (step 916). The VPN server 860 sends TCP response data (step 918), the VPN listening socket 864 writes a response back to the client socket (step 920), and the TUN interface 852 modifies the packet and sends TCP response data (step 922).

Figure 20:
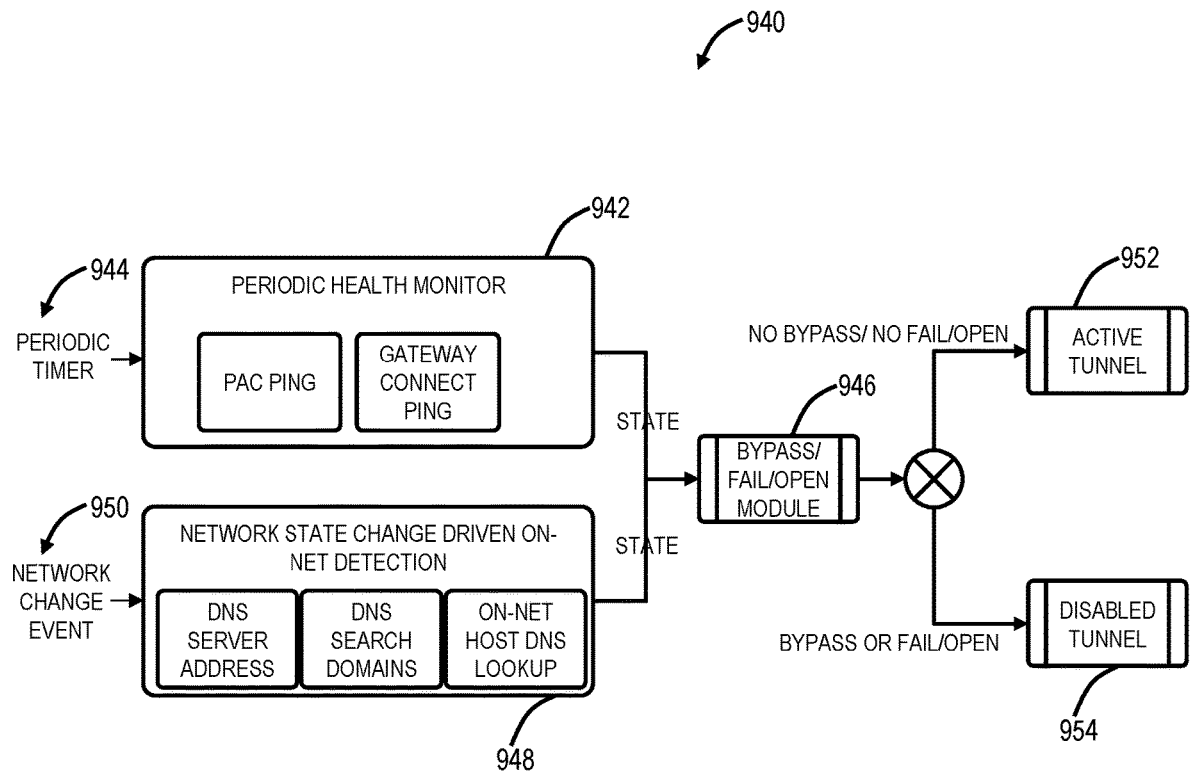
FIG. 20 is a flow diagram of tunnel forwarding rules by the unified agent application.

FIG. 20 is a flow diagram of tunnel forwarding rules 940 by the unified agent application 600. A periodic health monitor function 942 operates, based on a periodic timer 944, to check a PAC ping and a gateway connect ping to provide a state to a bypass fail/open module 946. A network state change function 948 is configured to detect a network change event 950 such as DNS server address, DNS search domains, on-net host DNS lookups, etc., and to provide a state to the bypass fail/open module 946. The bypass fail/open module 946 creates an active tunnel 952 or disabled tunnel 954 based on the states.

§ 8.0 MULTIDIMENSIONAL RISK PROFILING FOR NETWORK ACCESS CONTROL

Figure 21:
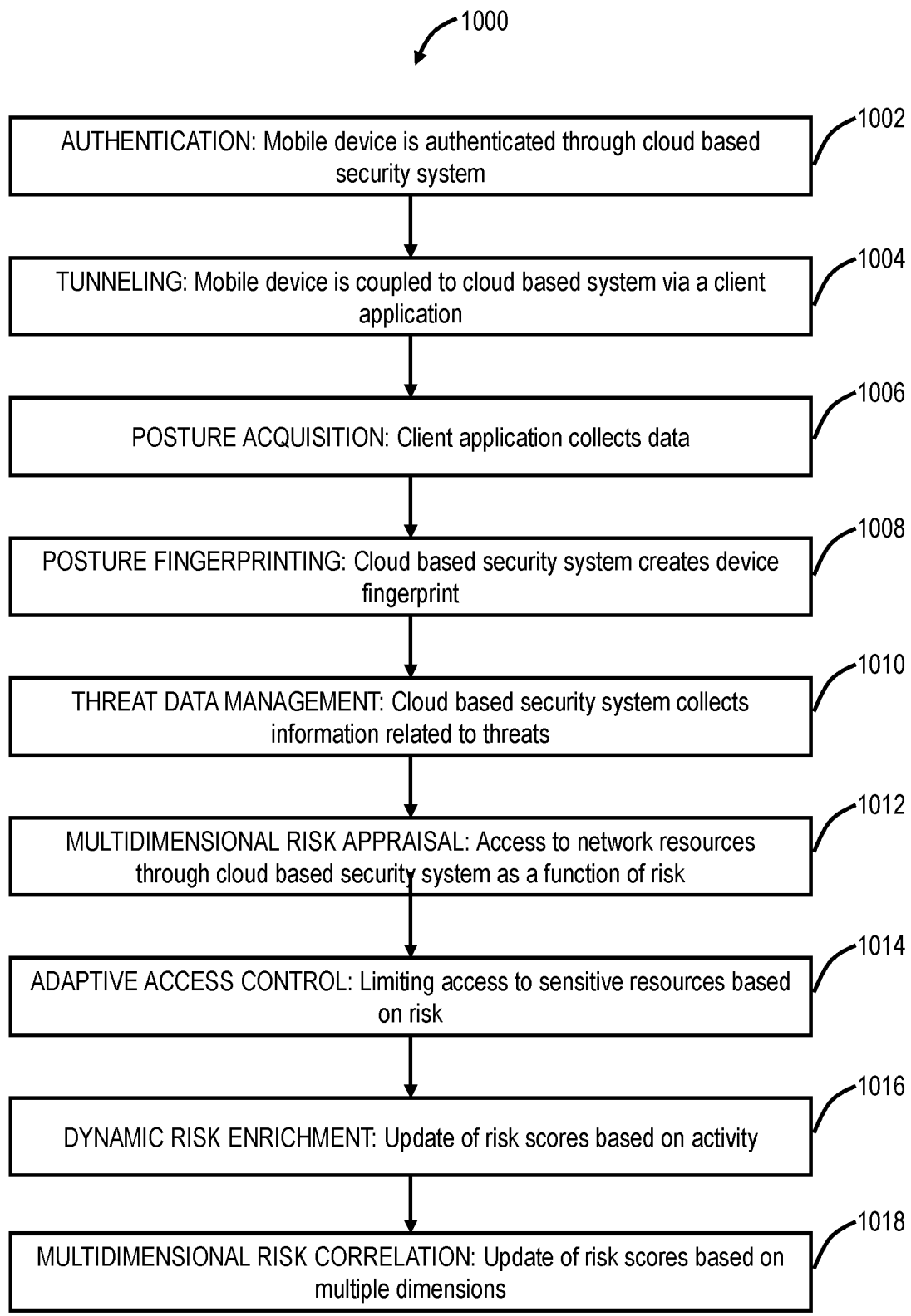
FIG. 21 is a flowchart of a multidimensional risk profiling process for NAC via a cloud-based security system and the unified agent application.

FIG. 21 is a flowchart of a multidimensional risk profiling process 1000 for NAC via a cloud-based security system 100, 500, 550 and the unified agent application 600. Again, the multidimensional risk profiling process 1000 is a dynamic risk profiling mechanism for mobile devices from various dimensions which is then used to evaluate network access control by the cloud-based security system. In this manner, the multidimensional risk profiling process 1000 provides a context-aware, user adaptive and intelligent way to control network access.

The multidimensional risk profiling process 1000 includes authentication where a mobile device is authenticated through the cloud-based security system (step 1002). For example, when a user requests network access, the client application on the mobile device can perform authentication with the IDP, and after successful authentication, the user is granted access to the network through a network tunnel to the cloud-based security system. The mobile device is coupled to the cloud-based security system via a client application, i.e., the unified agent application 600. The network access and authentication can be via the client application.

The multidimensional risk profiling process 1000 includes the mobile device coupled to the cloud-based security system through a tunnel via the client application (step 1004). That is, the user is granted access to the network through a network tunnel to the cloud-based security system. The multidimensional risk profiling process 1000 includes posture acquisition where the client application collects data (step 1006). Specifically, the client application can collect device information and security telemetry and communicates it to the cloud-based security system. The client application listens for security critical events such as Operating System (OS) upgrades, abrupt geolocation changes, device information deviation, and changes in the installed application list and updates the cloud-based security system. The cloud-based security system evaluates the changes and computes a new risk index for the device.

The multidimensional risk profiling process 1000 includes posture fingerprinting where the cloud-based security system creates a mobile device fingerprint (step 1008). Specifically, the cloud-based security system creates a device fingerprint and a risk index for the mobile device based on the nature of applications installed on the system, operating system vulnerabilities, anti-virus status, patch level, device configuration, and the like. The multidimensional risk profiling process 1000 includes threat data management where the cloud-based security system collects information related to threats (step 1010). The cloud-based security system has a data enriching feed mechanism which collects information on all available threats at regular intervals. Based on the threat information, the cloud-based security system performs a threat analysis of the mobile device at regular intervals and updates the associated risk index.

The multidimensional risk profiling process 1000 includes multidimensional risk appraisal where access to network resources is through the cloud-based security system as a function of risk (step 1012). That is, the access to any resource on the network is a function of the risk of temporal credentials that are generated by the cloud-based security system for that particular resource at that time. The temporal credentials embody risk information of the user requesting the access, the mobile device and the application which are being used to access the resource, and the nature of resource itself. For example, a banking website has higher associated risk and must be denied from a high-risk application.

The multidimensional risk profiling process 1000 includes adaptive access control where access to sensitive resources is limited based on risk (step 1014). For example, for access to sensitive resources such as corporate applications, a high-risk user will be challenged with a multi-factor authentication scheme as configured by the enterprise. Also, based on the enterprise policy, the network can be quarantined to limit access to certain applications only. The multidimensional risk profiling process 1000 includes dynamic risk enrichment where risk scores for the mobile devices are updated based on activity (step 1016). Based on the network usage, the risk score of the user is updated with each network access. For example, access to malware or phishing sites, increases the risk index of the user. The client application listens for security critical events such as OS upgrades, abrupt geolocation changes, device information deviation, and changes in the installed application list and updates the cloud security system. The cloud-based security system evaluates the changes and computes a new updated risk index for the mobile device.

The multidimensional risk profiling process 1000 includes multidimensional risk correlation where the risk scores are updated for the mobile device based on multiple dimensions. A cloud-based approach allows correlation of risk from multiple dimensions. For example, if a known family of malware is correlated with an application, then the risk index of the application increases and thereby any user accessing the Internet from the same application will face a higher risk penalty. Similarly, if multiple malware requests are getting originated from the same geolocation, then the geolocation IP subnet may be flagged for malicious activity, and any user accessing the network from the same subnet or trying to access the same subnet may face stringent network access control.

The multidimensional risk profiling process 1000 surmounts the challenges imposed by on-premise NAC systems. Using the mobile devices in the enterprise with the cloud-based security system as disclosed herein creates a win-win situation for employees and the corporates. Using the cloud-based security system that employs multidimensional risk profiling of mobile devices, intelligent access control decisions can be achieved that minimizes the security risk and maximizes the user productivity. The cloud-based approach to assess risk eliminates the need for updating NAC servers with emerging threats information. Based on user risk, access to sensitive web resources (such as banking websites) or internal corporate resources can be denied or supported by multi-factor risk-based authentication models. Granular network quarantine restrictions can be achieved based on the risk level of the user and the enterprise policy. With a cloud-based approach to network access control, risk can be correlated universally from multiple perspectives that further accounts for better security. For example, if an otherwise benign user is trying to access an application which was recently accessed by a family of malware, the access can be immediately denied/quarantined.

§ 8.1 Risk Appraisal and Enrichment

Access to any network resource is a function of the Risk associated with the request. Let say a User "x" uses Application "a" on Device "d" to access a network resource "r" at time t. Temporal Risk is denoted by R(t) for tuple <x,a,d,r,t>.

$$R(t) = \frac{w_a U_x(t) + w_b A(a) + w_c D(d) + w_a NR(r) + w_e E(t)}{w_a + w_b + w_c + w_a + w_e}$$

where $U_x$ is the risk profile of user "x" till time "t", A is the risk associated with application "a", D is the risk associated with device posture "d", NR is the risk associated with accessing resource "r", E defines the environmental factors contributing to risk at time "t". This can include aspects like geolocation, user intention, global threat conditions. $w_x$ are the weights associated with the risk and can be configured as per the enterprise policy. For example, an enterprise that weighs application vulnerabilities more than the device vulnerability will have $w_b > w_c$. Note that all Risk functions have a range [−1, 1] where 1 denotes 100% risk, 0 denotes a 50% risk and −1 denotes no risk.

$R(t) \in [-1,1]$.

$U_x$ captures the risk profile of the user which changes with time and is directly proportional to the network access history, with present access weighing more than the past access:

$$U_x(t) \propto \sum_{a=1}^{t} (t - a + 1) R(t - a)$$

$Att = 0, U_x(0) = -1$ $Att = 1, U_x(1) = R(0)$

-continued $Att = 2, U_x(2) = \frac{2 \cdot R(1) + 1 \cdot R(0)}{2 + 1}$ $\vdots$ $Att = n,$ $U_x(n) = \frac{n \cdot R(n-1) + (n-1)R(n-2) + (n-2)R(n-3) + \ldots + R(0)}{n + (n-1) + (n-2) + (n-3) + \ldots + 1}$ This equation embodies the risk of the user at a current time based on the previous network access history. Recent access is weighed more than past access that is linearly discounted, i.e., the user is penalized based on how recent the user had a high temporal risk while accessing a network resource.

§ 8.2 Adaptive Access Control

Based on the temporal risk and enterprise policy, access to network resources can be controlled. Once a risk score is calculated for a particular access attempt, it is weighed against the relative level of risk tolerance assigned to the resource asset, for example:

if −1 R(t)<0, access to network resource will be unconditionally ALLOWED if 0≤R(t)<δ, access to network resource will be QUARANTINED where δis the enterprise specific risk tolerance. Further the user can be CAUTIONED to take remediation steps.

if δ≤R(t)≤1, access to network resource will be DENIED.

While this rule set applies for individual network resources, it can further be extended to quarantine or deny, entire or partial network access to a group of applications or the whole Internet. The evaluative criteria can be extended as: if $(R(t)=\int_{t_0}^{t} R(t)dt) > \phi$ then deny network access; where $t-t_0$ is the duration of cumulative risk evaluation and $\phi$ is the enterprise specific risk-limit beyond which all network access is denied. It essentially captures the number of penalties that a user is allowed beyond which the user has to lose access to network or get a quarantined version of it.

§ 8.3 Example Implementation of Multidimensional Risk Profiling

In an example implementation, the multidimensional risk profiling process 1000 can be implemented through various modules such as authentication, tunneling, posture acquisition, posture fingerprinting, threat data management, multidimensional risk appraisal, adaptive access control, dynamic risk enrichment, and multidimensional risk correlation.

§ 8.4 Authentication

The unified agent application 600 can perform authentication with an enterprise IDP as configured and network access can be disallowed prior to authentication. In an embodiment, the mobile clients can use proxy authentication to register to the cloud-based security system. This is not truly reliable as it depends on location/location-auth policy/VPN and other such factors to work correctly. To simplify this flow, the following new flow is proposed.

(1) The mobile client, e.g., the unified agent application 600, initiates an HTTPS request to CA as below:

login.zscaler.net/clstart?version=1&_domain=nestle.com&redrurl=<url-encoded-url-with-schema>

The query params are version=, _domain=, redrurl, GET

/clstart?version=1&_domain=nestle.com&redrurl=<url-encoded-posturl-with-schema>, the host is login.zscaler.net. On errors, domain is invalid [error in 307] or the redrurl is missing [reset connection].

(2) The above end-point begins the client authentication flow. The provided domain is the company that requires the authentication. The CA looks up the domain to find the company and their authentication mechanism. (3) If the company uses hosted OR ad/LDAP AUTH, [SAML AUTH flow starts at (5)]. The response will be a login form with input fields for [username] & [password]. The form is submitted via POST to the CA at below end-point.

```
login.zscaler.net/clicred. The HTTP content may look like
POST /clicred
Host: login.zscaler.net
Content-Length: xyz username=xyz@nestle.com&password=123456&redrurl=<url-encoded-
posturl-with-schema>
```

(4) CA performs user/password validation and responds with the message in (7). (5) If the company uses SAML, the response to the request (1) will be the SAMLRequest form. The SAMLRequest form will auto-submit to the IDP. Once authentication completes, the CA gets control back with the identity of the user. (6) Once the SAMLResponse comes back, the response in the message (7) is sent. (7) After authentication, a 307 redirect is sent to REDURL with a below format

```
Location: zsa://auth[?token=encrypted-cookie&...] to be appended.
307 query params - token= (on success), ecode= (on error), emsg= (on error). On error,
the same REDURL is sent with below format
zsa://auth?ecode=<code>&emsg=<message>
```

For tunnel authentication, (1) the client issues a GET web request to the tunnel authentication server with the domain name as the query parameter:
GET https://<auth-server>?domain=mockcompany.com
(2) the server identifies the IDP for the given domain and responds with an HTML page containing a SAML Request. (3) the client will redirect to the IDP with the SAML Request. (4) the IDP will challenge the client for credentials which can be of the form of username/password or client identity certificate. (5) on successful authentication, the IDP will generate an SAMLResponse for the tunnel authentication server. The client will record the SAMLAssertion for future tunnel negotiation. (6) In the case of error, the server will resend the challenge to the user.

§ 8.5 Tunneling

The unified agent application 600 can tunnel all network traffic to the cloud-based security system. The objectives of tunneling are (i) intercept all traffic at IP layer for system's or other VPN client's default route, and (ii) split traffic to the tunnel [for darknet hosted applications], Proxy [for Internet-bound cloud services] or Direct [for uninspected traffic] at both IP or Transport layer.

§ 8.6 Posture Acquisition

The unified agent application 600 collects device information at relevant time intervals. This information can include, without limitation: device hardware parameters, Applications Reputation, Applications Change List, OS Patches, Application versions, and the like. For example, the following posture is collected from the device wherever applicable and allowed:

```
                Processor Signature ->
                       CPUID
```

```
              Using IOCTL:
              Battery ->
                 BatteryManufactureName
                 BatterySerialNumber
                 BatteryUniqueID
              Storage ->
```

-continued

```
                 VendorId
                 ProductId
                 SerialNumber
                 BusType
                 Storage Cache ->
                    Version
                 ...
```

-continued

```
              Network Interface Card ->
                 Mac Address
```

§ 8.7 Posture Fingerprinting

The unified agent application 600 collects all the posture information and can create an SHA-256 HASH of the information, and assigns a unique device-id in a UUID format to the client. This device-ID is used to track the device in all the network access requests that the client generates.

§ 8.8 Threat Data Management

The cloud-based security system can be coupled to multiple threat databases that provide updated information on (1) Application Risk Reputation across different Application Versions and Operating Systems; (2) Operating System Vulnerabilities; (3) Web Resource Risk Potential based on phishing content, malicious content, advanced security risks such as Cross-Site Scripting (XSS), cookie stealing, DLP, and the like; (4) Command and Control (C&C) Botnet servers; and the like.

§ 8.9 Multidimensional Risk Appraisal

The cloud-based security system can perform risk appraisal for every request to any network resource. Risk evaluation is a function of device risk, application risk, resource risk, user risk, and environment risk. The device risk embodies risk involved in accessing a resource from a vulnerable device such as based on OS vulnerabilities, a number of high-risk applications installed on the device, etc. The application risk embodies risk involved in using a specific application to access a specific resource. For example, using an unsafe browser to access intranet resources, can result in a data breach. The resource risk embodies potential of the network resource to cause damage. The user risk is based on the user's network behavior to determine the risk associated with giving access to the user. The environment risk is based on geolocation IP and other environmental factors.

§ 8.10 Adaptive Policy and Access Control

This cloud-based approach allows extending role based access control to risk adaptable policy and access control, where access to a resource on the network is not only a function of the user role but is also dependent on how risky it is to give access to the user. This make policy and access control: context sensitive and adaptable to user risk.

§ 8.11 Dynamic Risk Enrichment

The risk profile of the user is based on the user browsing pattern which makes the risk profile dynamic. This allows giving access to users who are benign irrespective of whether they are carrying a known or unknown device, catering to the Bring your own Device (BYOD) model of operation.

§ 8.12 Multidimensional Risk Correlation

Risk can be correlated in the cloud-based security system from multiple dimensions of the device, application, resource, user risk, and the environment. Millions of data points can be correlated to update risk profiles of users. For instance, if a malicious user with high-risk index uses a set of applications that are statistically similar to another set of applications on another user's device, the risk profile of the latter user can then be updated accordingly. Such statistical similarities between applications, devices, user browsing patterns, geographic proximity, can be leveraged to protect enterprises against malicious encroachments and violation of enterprise access control policies.

§ 9.0 UNIQUE DEVICE IDENTIFICATION

The present disclosure includes a process for uniquely identifying a user device for management and policy enforcement by the cloud-based systems 100, 500, 550, etc. Constraints include uniqueness—no identifier should be used on more than one device, the identifier should not be stored on the device—it should be generated as needed, etc. Further, the process should include a device identifier that is the same for any user on the same device. The process should further include a user identifier than is unique for all users.

As such, the present disclosure includes two unique identifiers—a device identifier (e.g., device hardware fingerprint) and a user identifier (e.g., User Unique identifier). The device identifier and user identifier can be used as enrollment identifiers, e.g., a combined value of these identifiers can be used for enrollment to a cloud service, such as through the cloud-based systems 100, 500, 550.

In an embodiment, the device identifier and the user identifier can be generated locally on the user device 400, such as via the unified agent application 600. In other embodiments, these identifiers can be generated in the cloud-based systems 100, 500, 550, such as after sharing relevant details about the user device 400. Of course, these identifiers can be generated in various locations as will be apparent to those of ordinary skill in the art. The identifiers are used by the cloud-based systems 100, 500, 550 for enrollment, identification, management, etc. of the user device 400 and the corresponding users.

§ 9.1 Device Hardware Fingerprint

Again, the present disclosure includes a hardware fingerprint that is generated utilizing a set of parameters that are used such that it become tediously difficult to spoof it or reverse engineer it.

Following is the list of hardware parameters, along with how these are gathered, that can be used:
CPU ID
  Using Assembly code
Manufacturer's Serial Number
  Using Operating System API
Hard Drive Serial Number and other parameters
  Using IOCTL
    MediaType
    Version
    Size
    DeviceType
    DeviceTypeModifier
    RemovableMedia
    VendorId
    ProductId
    ProductRevision
    SerialNumber
Hard Drive Geometry
  Using IOCTL
    Cylinders
    TracksPerCylinder
    SectorsPerTrack
    BytesPerSector
Battery Serial Number
  Using IOCTL
    BatteryDeviceName
    BatteryGranularityInformation
    BatteryInformation
    BatteryManufactureDate
    BatteryManufactureName
    BatterySerialNumber
    BatteryUniqueID
BIO Serial Number
  Using IOCTL, when available otherwise
  Using Operating System API
Product UDID
  IOCTL, when available otherwise
  Using Operating System API

§ 9.2 User UID

Every OS platform assigns a unique identifier to every user account created on it. This can be utilized to differentiate between machine user's for a user device 400. User identifier can be SHA2 hash to avoid any leakage. Following is list of user identifier for different platforms:
Windows
  User Secure Identifier (SID)
MAC
  User UID
IOS
  User UID
Android
  User UID

§ 9.3 Hardware Fingerprint Process

Figure 22:
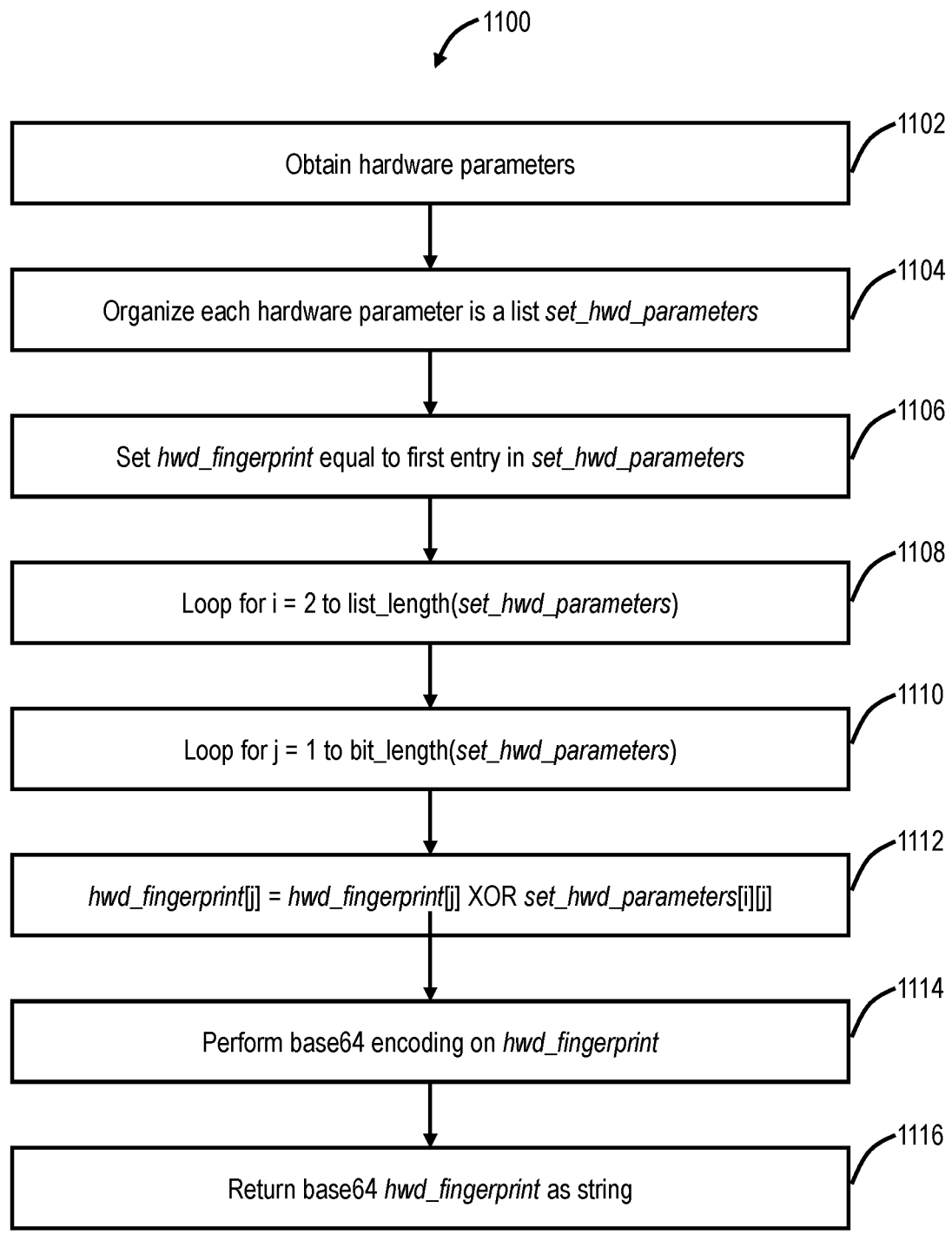
FIG. 22 is a flowchart of a hardware fingerprint process.

FIG. 22 is a flowchart of a hardware fingerprint process 1100. The process 1100 includes obtaining hardware parameters, such as using the techniques described above (step 1102). There can be a total number of hardware parameters referred to as list_length(set_hwd_parameters). The obtained hardware parameters are organized in a list of the length list_length(set_hwd_parameters) (step 1104). Each entry in set_hwd_parameters is set to a same length in terms of number of bits. For example, assume a bit length of 32, if an entry has a length below 32, bits can be appended to make the length 32. If an entry has a length greater than 32, there can be a truncation from the 33th byte to the last byte to make the length 32. So, there is a matrix of set_hwd_parameters of size list_length(set_hwd_parameters) by bit length.

A hwd_fingerprint is set equal to a first entry in set_hwd_parameters (step 1106). The hwd_fingerprint value is updated through two loops:

```
For i = 2 to list_length(set_hwd_params) (step 1108)
For j = 1 to bit_length(set_hwd_parameters) (step 1110).
hwd_fingerprint[j] = hwd_fingerprint[j] XOR set_hwd_params[i][j] (step 1112).
```

Once the loops have completed, base64 encoding is performed on the hwd_fingerprint (step 1114). The base64 hwd_fingerprint can be returned as a string (step 1116).

§ 9.4 Device Identification on Cloud Nodes

The processing nodes 110, the cloud nodes 502, etc. can use the hwd_fingerprint and the user UID for enrollment and management of cloud services. Specifically, a user device 400 can enroll in the cloud services by sending the unique identifier (device identifier (e.g., device hardware fingerprint) and a user identifier (e.g., User Unique identifier).

These identifiers can be stored in the cloud-based system 100, 500, 550 and used during operation. This helps the cloud nodes to control the devices remotely to detect the:

1. Posture
2. Physical state
3. Rooted (for mobile devices)
4. Services running and health of services
5. Revoke or force authentication
6. Block device from using service
7. Prevent specific users from accessing service from particular device Additionally, the data on the cloud nodes can further be used to collect the physical device to user mapping to further identify and apply policies that are user specific. Using device identifier, all location/user policy can be enforced including firewall, access, Antivirus (AV), etc.

An organization can track device usage by its employees and can always track the history of users who used the device. The device can have its own profile, representing traffic patterns and bandwidth usage, etc.

Another implication is to organize the data collected from the user devices 400 and present it to an administrator in a human readable format that can be categorized based on the above listed parameters that organizations can greatly benefit from.

§ 10.0 MICROSEGMENTATION

Workload segmentation includes an approach to segment application workloads. In an automated manner, with one click, the workload segmentation determines risk and applies identity-based protection to workloads-without any changes to the network. The software identity-based technology provides gap-free protection with policies that automatically adapt to environmental changes.

Microsegmentation originated as a way to moderate traffic between servers in the same network segment. It has evolved to include intra-segment traffic so that Server A can talk to Server B or Application A can communicate with Host B, and so on, as long as the identity of the requesting resource (server/application/host/user) matches the permission configured for that resource. Policies and permissions for microsegmentation can be based on resource identity, making it independent from the underlying infrastructure, unlike network segmentation, which relies on network addresses. This makes microsegmentation an ideal technique for creating intelligent groupings of workloads based on the characteristics of the workloads communicating inside the data center. Microsegmentation, a fundamental part of the Zero Trust Network Access (ZTNA) framework, is not reliant on dynamically changing networks or the business or technical requirements placed on them, so it is both stronger and more reliable security. It is also far simpler to manage-a segment can be protected with just a few identity-based policies instead of hundreds of address-based rules.

Figure 23:
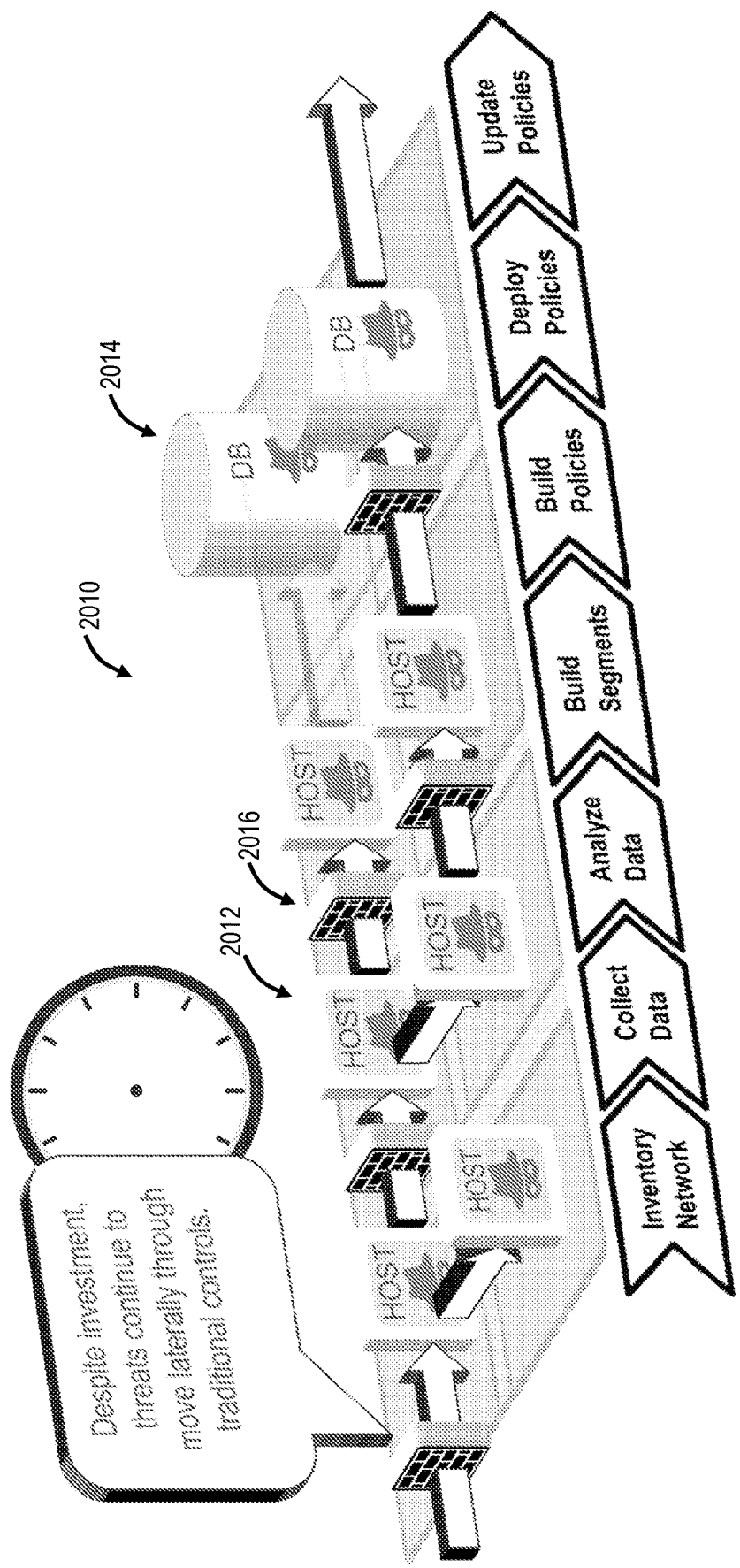
FIG. 23 is a network diagram of a network illustrating conventional microsegmentation.

FIG. 23 is a network diagram of a network 2010 illustrating conventional microsegmentation. The network 2010 includes hosts 2012, databases 2014, and firewalls 2016. Legacy network-based microsegmentation solutions rely on the firewalls 2016, which use network addresses for enforcing rules. This reliance on network addresses is problematic because networks constantly change, which means policies must be continually updated as applications and devices move. The constant updates are a challenge in a data center, and even more so in the cloud and where Internet Protocols (IP) addresses are ephemeral. Network address-based approaches for segmentation cannot identify what is communicating—for example, the software's identity-they can only tell how it is communicating, such as the IP address, port, or protocol from which the "request" originated. As long as they are deemed "safe," communications are allowed, even though IT does not know exactly what is trying to communicate. Furthermore, once an entity is inside a network zone, the entity is trusted. But this trust model can lead to breaches, and that is one major reason microsegmentation evolved.

Figure 24:
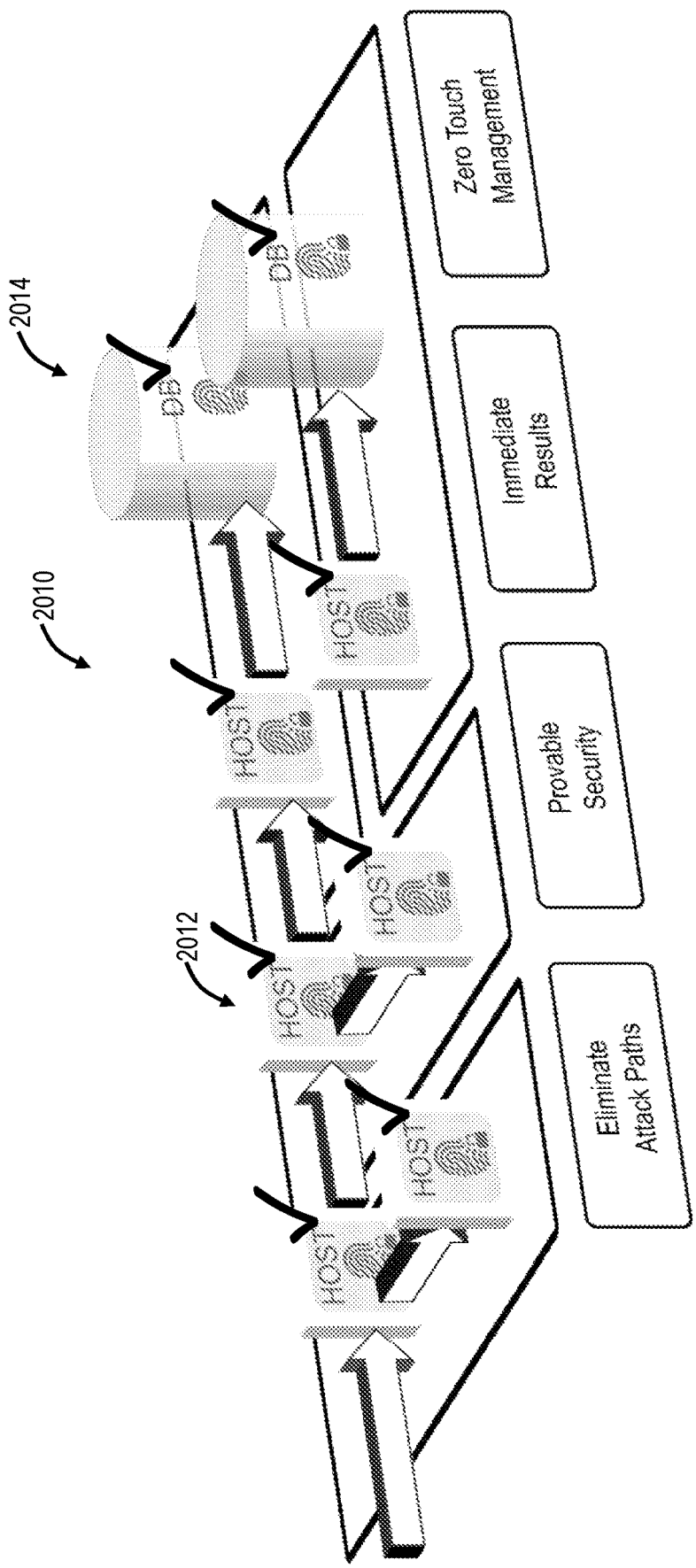
FIG. 24 is a network diagram of the network illustrating automated microsegmentation.

FIG. 24 is a network diagram of the network 2010 illustrating automated microsegmentation. Microsegmentation is a way to create secure zones so that companies can isolate workloads from one another and secure them individually. It is designed to enable granular partitioning of traffic to provide greater attack resistance. With microsegmentation, IT teams can tailor security settings to different traffic types, creating policies that limit network and application flows between workloads to those that are explicitly permitted. In this zero trust security model, a company could set up a policy, for example, that states medical devices can only talk to other medical devices. And if a device or workload moves, the security policies and attributes move with it. By applying segmentation rules down to the workload or application, IT can reduce the risk of an attacker moving from one compromised workload or application to another.

Microsegmentation is not the same as network segmentation. It is fairly common for network segmentation and microsegmentation to be used interchangeably. In reality, they are completely different concepts. Network segmentation is best used for north-south traffic, meaning the traffic that moves into and out of the network. With network segmentation, an entity, such as a user, is generally considered trusted once inside a network's designated zone.

Microsegmentation is best used for east-west traffic, or traffic that moves across the data center network—server-to-server, application-to-server, etc. Simply put, network segmentation is the castle's outer walls, while microsegmentation represents the guards standing at each of the castle's doors.

Microsegmentation's main purpose is to reduce the network attack surface by limiting east-west communication by applying granular security controls at the workload level. In the simplest terms, the differences between microsegmentation and network segmentation can be boiled down to:

| Segmentation | Microsegmentation |
| --- | --- |
| Coarse policies | Granular policies |
| Physical network | Virtual or overlay network |
| North-south traffic | East-west traffic |
| Address based/network level | Identity-based/workload level |
| Hardware | Software |

Since policies and permissions for microsegmentation are based on resource identity (versus a user's/person's identity), it is independent of the underlying infrastructure, which means: Fewer policies to manage, centralized policy management across networks, policies that automatically adapt regardless of infrastructure changes, and gap-free protection across cloud, container, and on-premises data centers.

Generally, microsegmentation creates intelligent groupings of workloads based on characteristics of the workloads communicating inside the data center. As such, microsegmentation is not reliant on dynamically changing networks or the business or technical requirements placed on them, which means that it is both stronger and more reliable security.

§ 10.1 Fingerprinting

In an embodiment, the network 2010 can include cryptographic identity of workloads for identifying communications, authorizing communications, etc. The cryptographic identity is used to verify software and/or machine identity, i.e., the identify of the applications and the identity of the devices, hosts. The cryptographic identity can be referred to as a device or application fingerprint. Importantly, the cryptographic identity is based on multiple characteristics to ensure unique identification and prevent spoofing. The cryptographic identity can based on a combination of any of the following:

| Software | Host | Network |
| --- | --- | --- |
| Hash (SHA256) | Operating System | Network namespace |
| Locality Sensitive Hash (LSH) | Provisioned Hostname | IP Address |
| Executable Signing | BIOS UUID | Port |
| Portable Executable (PE) Header values | CPU Serial numbers | Protocol |
| Process Identifiers | User ID | MAC Address |
| Container/Image ID | Other hardware parameters | |

Figure 25:
FIG. 25 is a block diagram of two systems communicating to one another and their example cryptographic identities, i.e., fingerprints.
Figure 25:
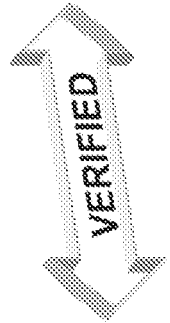
Figure 25:

Also, the cryptographic identity can include values based on Software Reputation, Behavioral Scoring, Capabilities Classification, and the like. FIG. 25 is a block diagram of two systems communicating to one another and their example cryptographic identities, i.e., fingerprints. A key aspect of the cryptographic identity is its resilience to software upgrades and Continuous Integration/Continuous Deployment (CI/CD).

§ 10.2 Agent Application

In an embodiment, the unified agent application 600 described herein can be referred to as an agent, client connector, etc. The application 600 as an agent can be install on machines, e.g., the server 300, the user device 400, or generally referred to as hosts. As described herein, a host is something that interacts with the cloud-based system 100. The host can be a server 300, a user device 400, a Virtual Machine (VM), a container, enterprise servers 216, data or data stores 214, Internet of Things (IoT) devices, and the like.

The agent, residing partially in the kernel, hooks into attempts to send and read from the network. The agent can send related information to the cloud-based system 100, so we can understand what's happening on the network; also, after policies have started being enforced, the agent receives those policies and then can prevent other apps from sending and receiving from certain other hosts, as the policies direct.

§ 10.3 Fingerprinting with the Agent Application for Workload Segmentation

The agent needs to know what host it is executed on. In easy cases this is easy, but in more complicated cases—in cases of containerization, virtualization or cloning—it is necessary to identify the hardware, and find out if it is the same host, or a different previously-known host (with pre-existing but different policies) or if it is a new host (possibly with default policies to enforce).

In this manner, the various fingerprinting techniques described herein can be used to uniquely identify a host on which the agent (application 600) is operating on, and this unique fingerprint can be used by the cloud-based system 100 to manage the device, assign policy, and the like.

In an embodiment, a given host has a device fingerprint created for it, and this device fingerprint can be used to determine if the agent is running on the same or on different hardware. Also, it allows us to use the device fingerprint to accelerate finding the right set of policies to use for a host. Finally, with containerization there may be more than one agent installed on a network with the same agent ID; using the device fingerprint, we can better distinguish multiple equivalent agent ID, and decide which agent enforces which policies.

§ 11.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming at least one processor to perform steps of:
   obtaining a plurality of parameters associated with a host;
   determining a fingerprint of the host utilizing the plurality of parameters; and
   providing the fingerprint to cloud service for enrollment and management of the host in the cloud service.

2. The non-transitory computer-readable storage medium of claim 1, wherein the host is a user device having an agent operating thereon to perform the determining.

3. The non-transitory computer-readable storage medium of claim 1, wherein the host is any of a server, virtual machine, and a container.

4. The non-transitory computer-readable storage medium of claim 3, wherein the cloud service includes microsegmentation of the host.

5. The non-transitory computer-readable storage medium of claim 1, wherein the cloud service is configured to match a unique identifier of the host with the fingerprint for the enrollment and management.

6. The non-transitory computer-readable storage medium of claim 1, wherein the plurality of parameters are obtained through any of assembly code and operating system Application Programming Interfaces (APIs).

7. The non-transitory computer-readable storage medium of claim 1, wherein the plurality of parameters relate to any of a processor identifier, a manufacturer serial number, a hard drive serial number, hard drive parameters, and battery.

8. The non-transitory computer-readable storage medium of claim 1, wherein the computer readable code is further configured to program the processor to perform steps of
   subsequent to the enrollment of the host in the cloud service, redetermining the fingerprint locally on the host for operation of the cloud service, such that the fingerprint is recomputed and not stored on the host.

9. The non-transitory computer-readable storage medium of claim 1, wherein the fingerprint is determined based on a computation of the plurality of parameters that is unique for every device.

10. The non-transitory computer-readable storage medium of claim 1, wherein the cloud service includes any of Internet access for the host and private resource access by the host.

11. A method comprising steps of:
    obtaining a plurality of parameters associated with a host;
    determining a fingerprint of the host utilizing the plurality of parameters; and
    providing the fingerprint to cloud service for enrollment and management of the host in the cloud service.

12. The method of claim 11, wherein the host is a user device having an agent operating thereon to perform the determining.

13. The method of claim 11, wherein the host is any of a server, virtual machine, and a container.

14. The method of claim 13, wherein the cloud service includes microsegmentation of the host.

15. The method of claim 11, wherein the cloud service is configured to match a unique identifier of the host with the fingerprint for the enrollment and management.

16. The method of claim 11, wherein the plurality of parameters are obtained through any of assembly code and operating system Application Programming Interfaces (APIs).

17. The method of claim 11, wherein the plurality of parameters relate to any of a processor identifier, a manufacturer serial number, a hard drive serial number, hard drive parameters, and battery.

18. The method of claim 11, wherein the steps further include
    subsequent to the enrollment of the host in the cloud service, redetermining the fingerprint locally on the host for operation of the cloud service, such that the fingerprint is recomputed and not stored on the host.

19. The method of claim 11, wherein the fingerprint is determined based on a computation of the plurality of parameters that is unique for every device.

20. The method of claim 11, wherein the cloud service includes any of Internet access for the host and private resource access by the host.

* * * * *